United States Patent
Moffatt

(10) Patent No.: US 7,813,433 B2
(45) Date of Patent: *Oct. 12, 2010

(54) SYSTEM AND METHOD FOR COMMUNICATING DATA USING SYMBOL-BASED RANDOMIZED ORTHOGONAL FREQUENCY DIVISION MULTIPLEXING (OFDM) WITH SELECTED SUBCARRIERS TURNED ON OR OFF

(75) Inventor: Christopher D. Moffatt, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 997 days.

This patent is subject to a terminal disclaimer.

(21) Appl. No.: 11/464,861

(22) Filed: Aug. 16, 2006

(65) Prior Publication Data

US 2008/0043860 A1 Feb. 21, 2008

(51) Int. Cl.
H04K 1/10 (2006.01)
(52) U.S. Cl. .......... 375/260; 375/261; 375/268; 375/297; 375/298; 375/300; 375/324; 375/348; 375/349
(58) Field of Classification Search .......... 375/260, 375/261, 268, 297, 298, 300, 324, 348, 349
See application file for complete search history.

(56) References Cited

U.S. PATENT DOCUMENTS

| | | | |
|---|---|---|---|
| 6,038,263 A | 3/2000 | Kotzin et al. ........... 375/299 |
| 6,175,551 B1 | 1/2001 | Awater et al. ........... 370/210 |
| 6,269,132 B1 | 7/2001 | Yonge, III ............ 375/346 |
| 6,473,467 B1 | 10/2002 | Wallace et al. .......... 375/267 |
| 6,556,557 B1 | 4/2003 | Cimini, Jr. et al. ......... 370/342 |
| 6,697,415 B1 | 2/2004 | Mahany ............... 375/130 |
| 6,724,834 B2 | 4/2004 | Garrett et al. ............ 375/317 |
| 6,798,847 B2 | 9/2004 | Hwang et al. ............ 375/299 |
| 6,928,084 B2 | 8/2005 | Cimini, Jr. et al. ........ 370/430 |
| 7,027,782 B2 | 4/2006 | Moon et al. .............. 455/102 |
| 7,039,001 B2 | 5/2006 | Krishnan et al. .......... 370/203 |
| 7,170,849 B1 | 1/2007 | Arivoli et al. ............ 370/208 |
| 7,280,464 B1 * | 10/2007 | Newhouse et al. ........ 370/203 |

(Continued)

OTHER PUBLICATIONS

Kim et al.,"*Frequency-Hopped Multiple-Access Communications with Multicarrier On-Off Keying in Rayleigh Fading Channels*," IEEE Transactions on Communications, vol. 48, No. 10, Oct. 2000, pp. 1692-1701.

*Primary Examiner*—Shuwang Liu
*Assistant Examiner*—Kabir A Timory
(74) *Attorney, Agent, or Firm*—Allen, Dyer, Doppelt, Milbrath & Gilchrist, P.A.

(57) ABSTRACT

A device and system communicates data and includes a modulation and mapping circuit that modulates and maps data symbols into a plurality of multiple subcarrier frequencies that are orthogonal to each other to form an Orthogonal Frequency Division Multiplexed (OFDM) communications signal based on a fixed or variable OFDM symbol rate. A pseudo-random signal generator is operative with the modulation and mapping circuit and generates pseudo-random signals to the modulation and mapping circuit based on an encryption algorithm for frequency hopping each subcarrier at an OFDM symbol rate to lower any probability of interception and detection, reduce power per frequency (dB/Hz/sec), and lower any required transmission power while maintaining an instantaneous signal-to-noise ratio, wherein selected subcarriers are turned ON or OFF to increase the transmit power and signal-to-noise ratio and reduce the Inter-Carrier Interference (ICI) and adverse effects of frequency selective fading.

40 Claims, 24 Drawing Sheets

U.S. PATENT DOCUMENTS

| | | | |
|---|---|---|---|
| 7,289,459 B2 | 10/2007 | Hayashi et al. | 370/320 |
| 2001/0021182 A1 | 9/2001 | Wakutsu | 370/344 |
| 2002/0191569 A1 | 12/2002 | Sung et al. | 370/335 |
| 2003/0026346 A1 | 2/2003 | Matsumoto et al. | 375/262 |
| 2003/0081538 A1 | 5/2003 | Walton et al. | 370/206 |
| 2004/0001429 A1 | 1/2004 | Ma et al. | 370/210 |
| 2004/0005016 A1 | 1/2004 | Tewfik et al. | 375/302 |
| 2004/0009783 A1* | 1/2004 | Miyoshi | 455/522 |
| 2004/0085892 A1 | 5/2004 | Walton et al. | 370/208 |
| 2004/0092281 A1 | 5/2004 | Burchfiel | 455/522 |
| 2004/0190640 A1* | 9/2004 | Dubuc et al. | 375/260 |
| 2004/0218523 A1 | 11/2004 | Varshney et al. | 370/208 |
| 2005/0025042 A1 | 2/2005 | Hadad | 370/208 |
| 2005/0031016 A1 | 2/2005 | Rosen | 375/130 |
| 2005/0032514 A1* | 2/2005 | Sadri et al. | 455/423 |
| 2005/0041746 A1 | 2/2005 | Rosen et al. | 375/242 |
| 2005/0128936 A1 | 6/2005 | Shao | 370/208 |
| 2005/0152466 A1 | 7/2005 | Maltsev et al. | 375/260 |
| 2005/0159115 A1 | 7/2005 | Sandhu | 455/101 |
| 2005/0169353 A1 | 8/2005 | An et al. | 375/147 |
| 2005/0197076 A1 | 9/2005 | Saito et al. | 455/108 |
| 2005/0220174 A1 | 10/2005 | Mills et al. | 375/132 |
| 2006/0029012 A1 | 2/2006 | Mottier et al. | 370/320 |
| 2006/0039272 A1 | 2/2006 | Sikri et al. | 370/208 |
| 2006/0050626 A1 | 3/2006 | Yucek et al. | 370/208 |
| 2006/0083211 A1* | 4/2006 | Laroia et al. | 370/343 |
| 2006/0109919 A1 | 5/2006 | Nieto | 375/260 |
| 2006/0129621 A1 | 6/2006 | Kim et al. | 708/404 |
| 2006/0133522 A1* | 6/2006 | Sutivong et al. | 375/260 |
| 2006/0146693 A1 | 7/2006 | Mori et al. | 370/208 |
| 2007/0058693 A1* | 3/2007 | Aytur et al. | 375/130 |
| 2007/0058734 A1 | 3/2007 | Kao et al. | 375/260 |

* cited by examiner

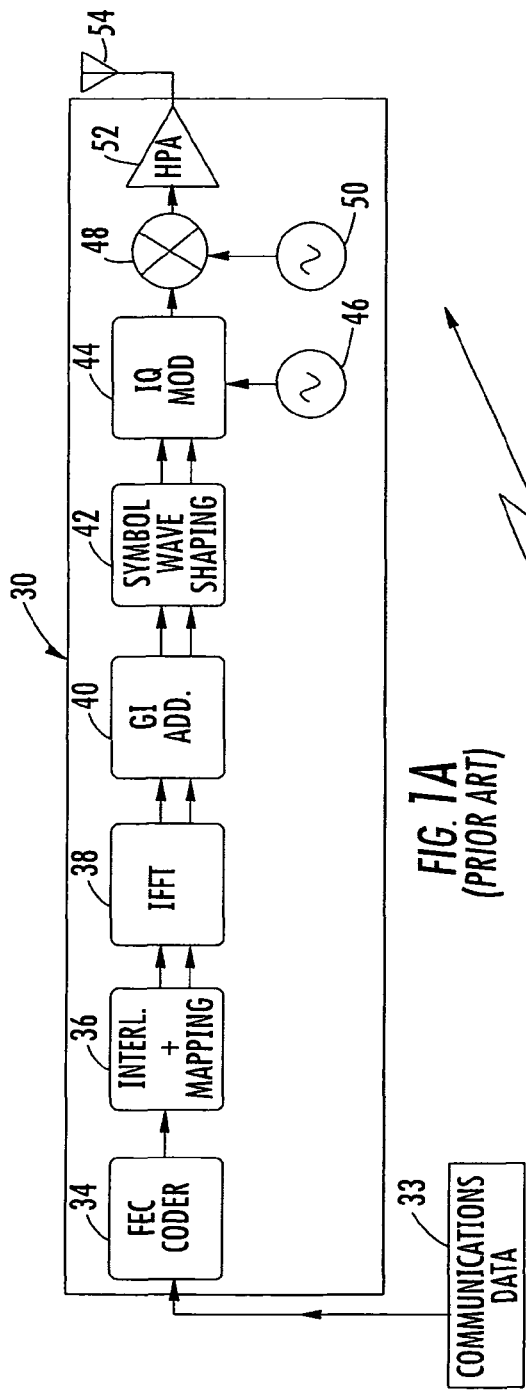
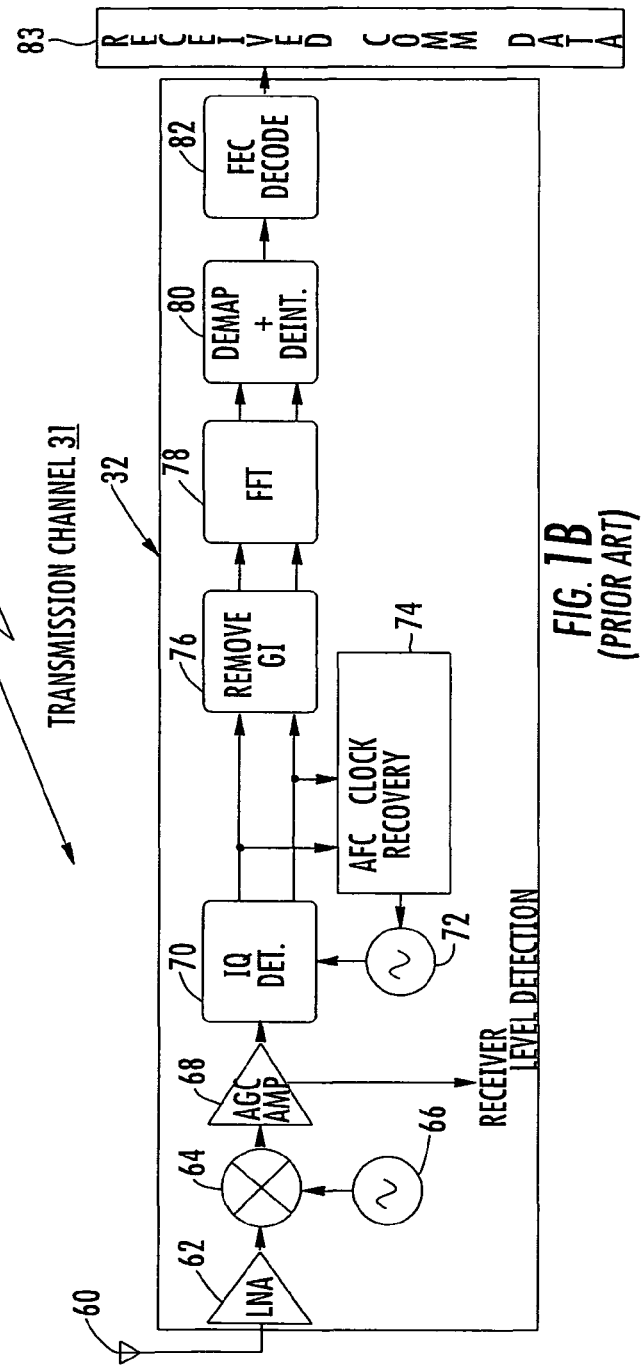
FIG. 1A (PRIOR ART)
FIG. 1B (PRIOR ART)

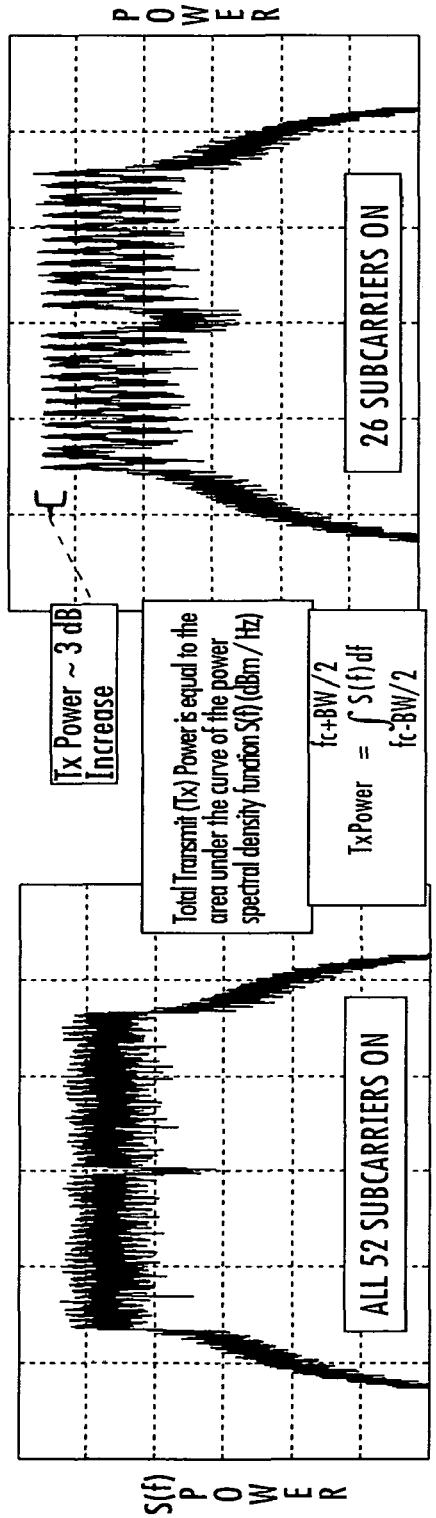
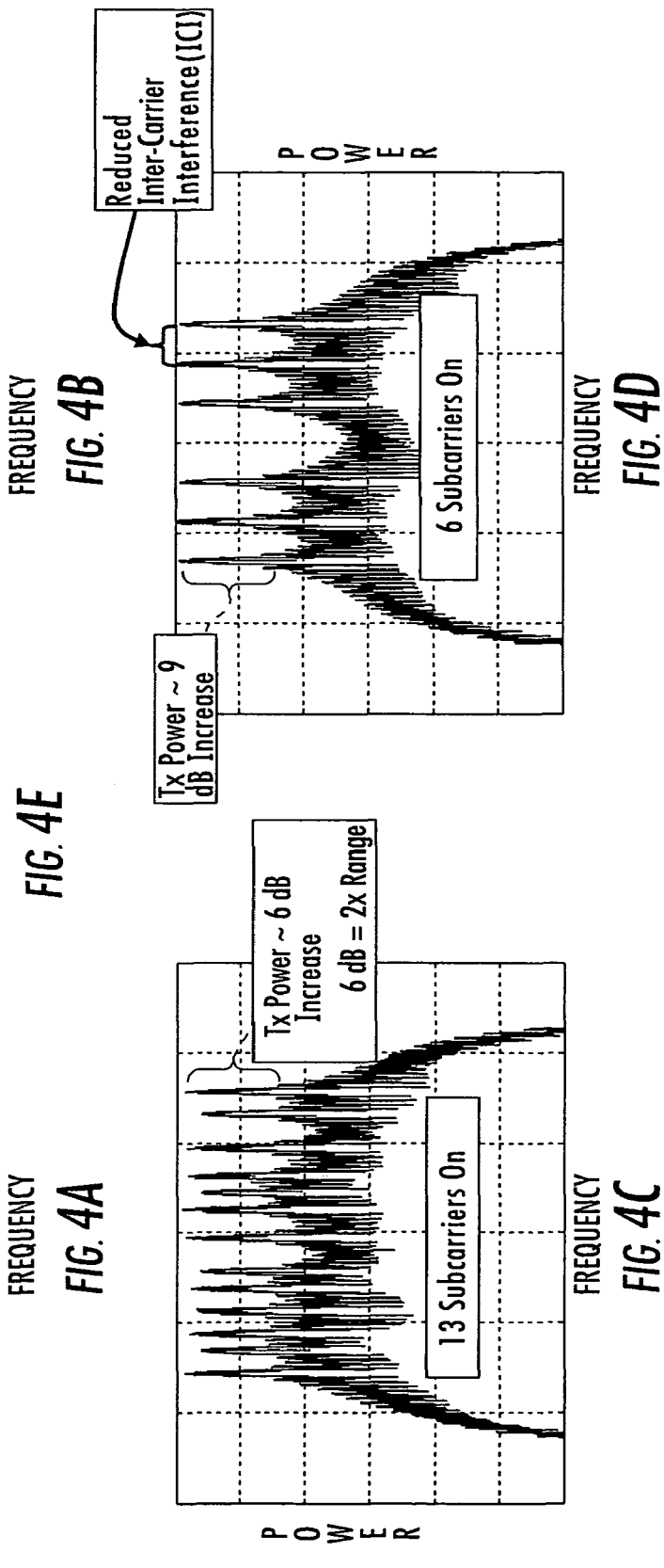

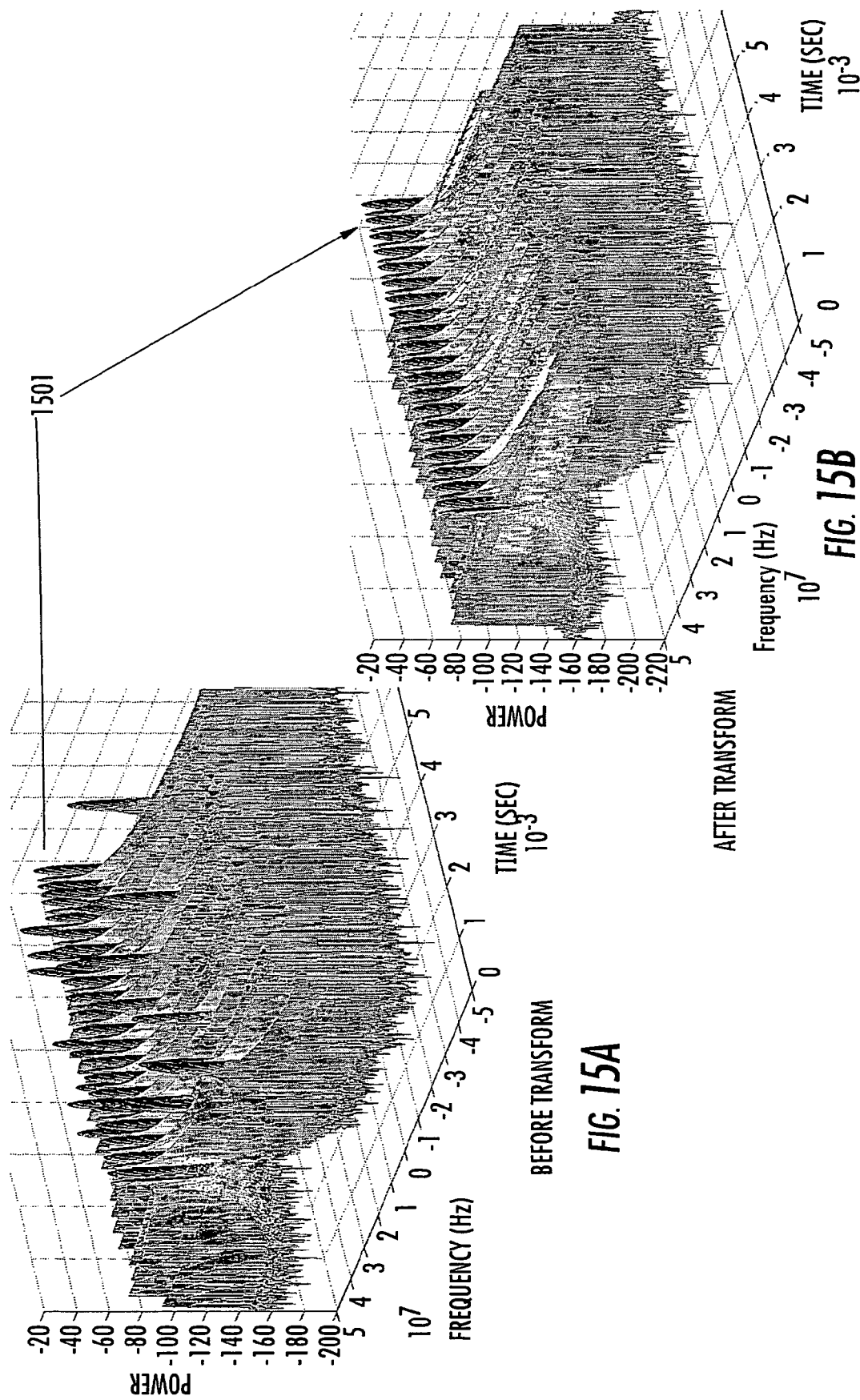
FIG. 15A BEFORE TRANSFORM
FIG. 15B AFTER TRANSFORM

SYSTEM AND METHOD FOR COMMUNICATING DATA USING SYMBOL-BASED RANDOMIZED ORTHOGONAL FREQUENCY DIVISION MULTIPLEXING (OFDM) WITH SELECTED SUBCARRIERS TURNED ON OR OFF

FIELD OF THE INVENTION

The present invention relates to communications systems, and more particularly, this invention relates to multiple carrier communication systems, including but not limited to, Orthogonal Frequency Division Multiplexing (OFDM) communications systems.

BACKGROUND OF THE INVENTION

In OFDM communications systems the frequencies and modulation of a frequency-division multiplexing (FDM) communications signal are arranged orthogonal with each other to eliminate interference between signals on each frequency. In this system, low-rate modulations with relatively long symbols compared to the channel time characteristics are less sensitive to multipath propagation issues. OFDM thus transmits a number of low symbol-rate data streams on separate narrow frequency subbands using multiple frequencies simultaneously instead of transmitting a single, high symbol-rate stream on one wide frequency band on a single frequency. These multiple subbands have the advantage that the channel propagation effects are generally more constant over a given subband than over the entire channel as a whole. A classical In-phase/Quadrature (I/Q) modulation can be transmitted over individual subbands. Also, OFDM is typically used in conjunction with a Forward Error Correction scheme, which in this instance, is sometimes termed Coded Orthogonal FDM or COFDM.

An OFDM signal can be considered the sum of a number of orthogonal subcarrier signals, with baseband data on each individual subcarrier independently modulated, for example, by Quadrature Amplitude Modulation (QAM) or Phase-Shift Keying (PSK). This baseband signal can also modulate a main RF carrier.

OFDM communications systems have high spectrum efficiency (a high number of bits per second per Hz of bandwidth), simple mitigation of multi-path interference, and an ease in filtering noise. OFDM communications systems suffer, however, from time-variations in the channel, especially those which cause carrier frequency offsets. Because the OFDM signal is the sum of a large number of subcarrier signals, it can have a high peak-to-average amplitude or power ratio. It is also necessary to minimize intermodulation between subcarrier signals, which can create self-interference in-band, and create adjacent channel interference. Carrier phase noise, Doppler frequency shifts, and clock jitter can create Inter-Carrier Interference (ICI) for closely frequency-spaced subcarriers. The subcarriers are typically transmitted at assigned frequency locations within a transmission spectrum. Over the duration of the transmission of an OFDM signal, the average power per subcarrier is significant, and can be easily detected and intercepted, which is undesirable to a system requiring Low Probability of Detection (LPD) and Low Probability of Interception (LPI) characteristics. The receiver that is to receive the OFDM signal requires a minimum signal-to-noise ratio (SNR) per subcarrier in order to demodulate and decode the signal with an acceptably low bit error rate (BER). If there is other unwanted energy within the transmission spectrum, the SNR can decrease causing an increase in BER. Said unwanted energy can be unintentional noise from other sources. In this case the noise is referred to as "interference" and the sources are referred to as "interferers." If the unwanted energy corrupting the transmission is transmitted intentionally by some third party source known as a jammer, it is referred to as a jamming signal. The conventional OFDM signal is susceptible to such interferers and jammers because of the required minimum SNR per subcarrier for an acceptably low BER. Further, frequency selective fading in the channel causes transmission nulls within the OFDM signal's transmission spectrum, which selectively reduce the SNR on certain subcarriers within those nulls, depending on their frequency location, leading to an undesirable increase in BER.

SUMMARY OF THE INVENTION

A device and system communicates data and includes a modulation and mapping circuit that modulates and maps data symbols into a plurality of multiple subcarrier frequencies that are orthogonal to each other to form an Orthogonal Frequency Division Multiplexed (OFDM) communications signal based on a fixed or variable OFDM symbol rate. A pseudo-random signal generator is operative with the modulation and mapping circuit and generates pseudo-random signals to the modulation and mapping circuit based on an encryption algorithm for frequency hopping each subcarrier at an OFDM symbol rate to lower any probability of interception and detection, reduce power per frequency (dB/Hz/sec), and lower any required transmission power while maintaining an instantaneous signal-to-noise ratio, wherein selected subcarriers are turned ON or OFF to increase the transmit power and signal-to-noise ratio and reduce the Inter-Carrier Interference (ICI) and adverse effects of frequency selective fading.

In yet another aspect, the selected subcarriers can be turned ON or OFF depending on the required data rate to be transmitted. The selected subcarriers can be turned ON or OFF relative to the number of subcarriers and desired transmit power for allowing a trade-off for data rate and distance within the same spectral mask. The pseudo-random generator can be formed as a dead-time, pseudo-random generator for decreasing the ON time of subcarriers and increasing the output spacing of symbols to reduce continuous transmission time. The spacing between symbols can be varied to prevent lines and reduce cyclostationary statistics of the signal. Selected subcarriers can be turned ON or OFF based on one of at least received signal-to-noise ratio, location of interferers, channel impairments, negotiated channel mask with a receiver, desired data rate, desired signal range and transmit power requirements. The frequency domain spreader circuit can spread any ON subcarriers over the frequency domain.

In yet another aspect, the pseudo-random signal generator can be operative for generating a pseudo-random signal based on the encryption algorithm such that consecutive OFDM symbols do not transmit subcarriers on the same frequency. This pseudo-random signal generator can also be operative for generating a pseudo-random random signal based on the encryption algorithm such that OFDM symbols do not transmit subcarriers on adjacent frequencies for reduced Inter-Carrier Interference (ICI). The signal generator can also be operative for generating a pseudo-random signal based on the encryption algorithm such that a guard interval is reduced or eliminated. The modulation and mapping circuit is operative for inserting signals for reducing peak-to-average power ratio (PAPR).

In yet another aspect, the pseudo-random signal generator is operatively connected to the modulator for varying amplitude and phase values using an encryption algorithm. An encoder can add a Forward Error Correction (FEC) code.

In yet another aspect, the device can be part of a transmitter that transmits the communications signal to a receiver that receives the communications signal and includes a demapping and demodulation circuit for processing the communications signal to obtain the communications data. This receiver can be operative for transmitting a signal back to the transmitter for varying the transmitted signal by selectively turning ON or OFF subcarriers. A method aspect is also set forth.

BRIEF DESCRIPTION OF THE DRAWINGS

Other objects, features, and advantages of the present invention will become apparent from the detailed description of the invention which follows, when considered in light of the accompanying drawings in which:

FIGS. 1A and 1B are prior art, high-level block diagrams showing a respective transmitter and receiver circuits for an IEEE 802.11a OFDM modem connected through a radio transmission channel.

FIGS. 4a-4d are spectral density graphs with each graph showing an OFDM spectrum, with one graph showing 52 subcarriers ON, and comparing this graph with a graph of spectrum in which a respective 26 subcarriers are ON, 13 subcarriers are ON, and 6 subcarriers are ON producing a reduced Inter-Carrier Interference (ICI). FIG. 4e is an explanation and equation representing total transmit power from a spectral density function.

FIGS. 15A and 15B are graphs showing a three-dimensional representation of the frequency hopping OFDM signal before and after the Walsh Transform and for illustration and comparison purposes showing a single carrier in the middle of the band.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The system, apparatus and method in accordance with a non-limiting example of the present invention uses a Symbol Based Randomization (SBR), Orthogonal Frequency Division Multiplexing (OFDM) communications signal to enhance the Low Probability of Interception (LPI) and Low Probability of Detection (LPD). This signal also allows an increased transmit power within a Federal Communications Commission (FCC) spectral mask by reducing the average power per Hertz per second while maintaining the same instantaneous signal-to-noise ratio (SNR). A frequency-domain spreading function, such as the Walsh transform, can also be applied in the frequency domain to enhance performance.

Orthogonal Frequency Division Multiplexing (OFDM) is also termed Multicarrier Modulation (MCM) because the signal uses multiple carrier signals that are transmitted at different frequencies. Some of the bits or symbols normally transmitted on one channel or carrier are now transmitted by this system on multiple carriers in the channel. Advanced Digital Signal Processing (DSP) techniques distribute the data over multiple carriers (subcarriers) at predetermined frequencies. For example, if the lowest-frequency subcarrier uses a base frequency, the other subcarriers could be integer multiples of that base frequency. The particular relationship among the subcarriers is considered the orthogonality such that the energy from one subcarrier can appear at a frequency where all other subcarrier's energy equal zero. There can be a superposition of frequencies in the same frequency range. This results in a lower symbol rate on each subcarrier with less Inter-Symbol Interference (ISI) due to adverse effects of multipath. In many OFDM communications systems, a Guard Interval (GI) or Cyclic Prefix (COP) is prefixed or appended to the OFDM symbol to mitigate the effects of ISI.

Figure 2A:
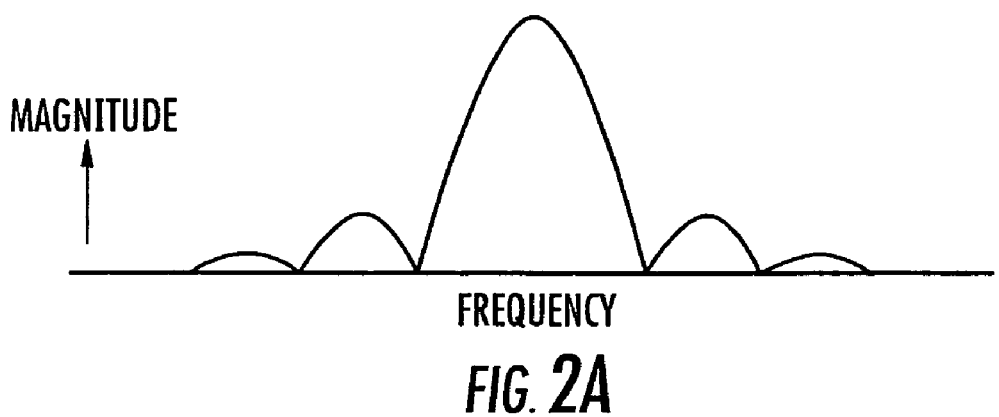
FIGS. 2A through 2C are spectrum graphs representing a) a single carrier signal; b) a Frequency Division Multiplexing (FDM) signal; and c) an Orthogonal Frequency Division Multiplexing (OFDM) signal.
Figure 2B:
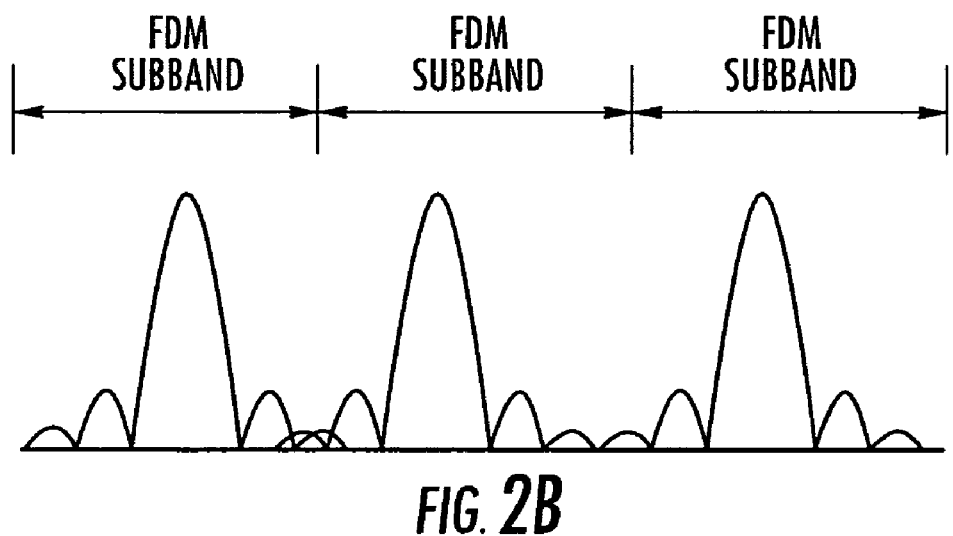
Figure 2C:
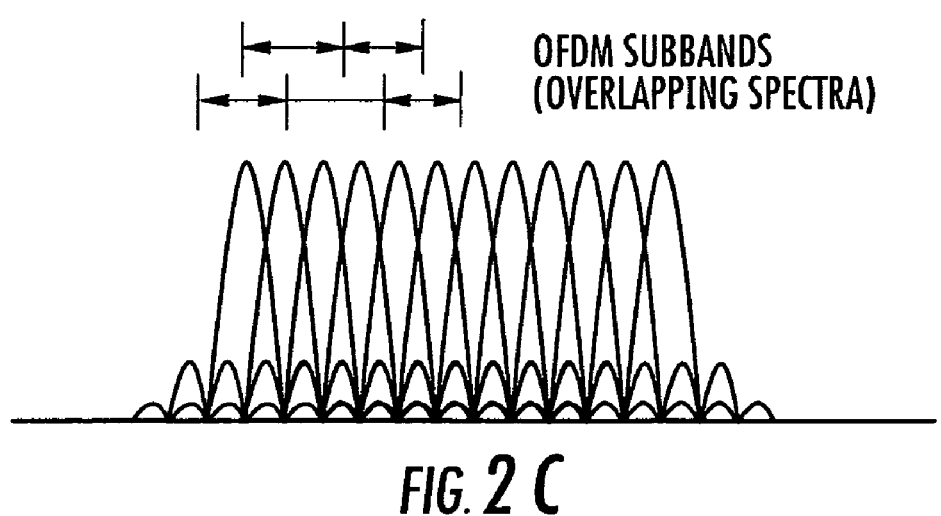

FIGS. 1A and 1B are high-level block diagrams showing basic circuit components of an IEEE 802.11a OFDM modem, and showing the transmitter circuit 30 in FIG. 1A and the receiver circuit 32 in FIG. 1B. The transmitter circuit 30 (also termed "transmitter" for clarity) transmits an OFDM signal as shown in FIG. 2C. By comparison, FIG. 2A shows the spectrum of a single carrier signal and FIG. 2B shows in comparison to the single carrier signal of FIG. 2A, the spectrum of a classical Frequency Division Multiplexing (FDM) signal. FIG. 2C shows the spectrum of an OFDM signal.

The drawings in FIG. 2A through 2C show that OFDM is based on a frequency-division multiplexing (FDM) system where each frequency channel is modulated. The frequencies and modulation of an FDM system are now orthogonal to each other to eliminate interference between channels. Because low-rate modulations with relatively long symbols compared to the channel time characteristics are less sensitive to multipath, an OFDM communications system allows a number of low-rate symbol streams to be transmitted simultaneously on multiple carriers rather than having one high-rate symbol stream transmitted on a single carrier. Thus, the frequency spectrum in an OFDM communications system is divided into multiple low-bandwidth subbands. Since each subband covers a relatively narrow section of the frequency spectrum, channel propagation effects are more constant or "flat" over a given subband compared to channel variations over the entire occupied spectrum. Any type of in-phase and quadrature (I/Q) modulation can be used to modulate any subcarrier, for example, Binary Phase Shift Keying (BPSK), Quadrature Phase Shift Keying (QPSK) or Quadrature Amplitude Modulation (QAM), or any of the numerous and different derivations of these modulation schemes. Different signal processing techniques, for example, channel coding, power allocation, adaptive modulation encoding, and similar schemes can be applied to one or more subbands. Multi-user allocation is also possible for example using time, coding, or frequency separation.

In an OFDM communications system using a transmitter and receiver such as shown in FIGS. 1A and 1B, one transmitter will transmit a signal on dozens or thousands of different orthogonal frequencies that are independent with respect to the relative amplitude and phase relationship between the frequencies. Each subcarrier signal typically will have space for only a single narrowband signal because the signals are closely spaced and it is important to prevent signals on adjacent subcarriers from interfering with each other. In an OFDM system, the symbols on each subcarrier are constructed such that energy from their frequency components are zero at the center of every other subcarrier, enabling a higher spectral efficiency for OFDM symbols than is possible in classic FDM.

The OFDM system as shown in FIGS. 1A and 1B includes channel coding as a Forward Error Correction (FEC) technique, using a Forward Error Correction encoder to create a coded orthogonal FDM (COFDM) signal. Channel-State Information (CSI) techniques can also be employed, including continuous wave (CW) interferer and/or selective channel systems.

An OFDM signal is typically the sum of each of the orthogonal subcarriers. Baseband data is independently modulated onto each of the orthogonal subcarriers using some type of modulation, such as Quadrature Amplitude Modulation (QAM) or Phase Shift Keying (PSK) schemes as discussed before. Because the spectrum of each subcarrier overlaps, it can be considerably wider than if no overlap were allowed. Thus, OFDM provides high spectrum efficiency. Because each subcarrier operates at a low symbol rate, the duration of each symbol in the subcarrier is long. (For clarity, "symbol rate" is equal to the inverse of "symbol duration"). By using Forward Error Correction (FEC) equalization and modulation, there can be an enhanced resistance against a) link dispersion, b) slowly changing phase distortion and fading, c) frequency response nulls, d) constant interference, and e) burst noise. Further, the use of a Guard Interval (GI) or cyclic prefix provides enhanced resistance against multipath in the transmission channel.

Typically, in OFDM communications system, a subcarrier and somewhat rectangular pulse can be employed and operative by an Inverse Discrete Fourier Transform (IDFT) using an Inverse Fast Fourier Transform (IFFT) circuit within the transmitter. At a receiver, a Fast Fourier Transform (FFT) circuit reverses this operation. The rectangular pulse shape results in a $Sin(x)/x$ spectrum in the subcarriers.

The spacing of subcarriers can be chosen such that the received subcarriers can cause zero or acceptably low Inter-Carrier Interference (ICI) when the receiver and transmitter are synchronized. Typically, OFDM communications systems split the available bandwidth into many narrow-band subbands from as little as a few dozen to as many as eight thousand to ten thousand. Unlike the communications system providing multiple channels using classical FDM as in FIG. 2b, the subcarriers for each subband in OFDM are orthogonal to each other and have close spacing and little overhead. In an OFDM communications system, there is also little overhead associated with any switching that may occur between users as in a Time Division Multiplexing Access (TDMA) communications system. Usually, the orthogonality of subcarriers in an OFDM communications system allows each carrier to have an integer number of cycles over a symbol period. As a result, the spectrum of a subcarrier has a null at the center frequency of its adjacent subcarriers.

Usually, in an OFDM communications system, the spectrum required for transmitting data is chosen based on the input data and a desired modulation scheme to be used with each carrier that is assigned the data to transmit. Any amplitude and phase of the carrier is calculated based on the modulation, for example, BPSK, QPSK or QAM as noted before. Any required spectrum is converted using the IFFT circuit to ensure carrier signals are orthogonal.

It should be understood that a FFT circuit transforms a cyclic time domain signal to an equivalent frequency spectrum by finding an equivalent waveform that is generated as a sum of orthogonal sinusoidal components. The frequency spectrum of the time domain signal is usually represented by the amplitude and phase sinusoidal components. The IFFT circuit performs the reverse process and transforms the spectrum of the amplitude and phase into a time domain signal. For example, an IFFT circuit can convert a set of complex data points into a time domain signal of the same number of points. Each complex input point will result in an integral number of sinusoid and cosinusoid cycles represented by the same number of points as were input to the IFFT. Each sinusoid known as the in-phase component, and cosinusoid known as the quadrature component, will be orthogonal to all other components generated by the IFFT. Thus, orthogonal carriers can be generated by setting an amplitude and phase for each frequency point representing a desired subcarrier frequency and performing the IFFT.

It should be understood that a Guard Interval (GI), also termed a cyclic prefix, often is added to an OFDM symbol. The guard interval reduces the effects of the wireless channel on Inter-Symbol Interference (ISI) and contains redundant transmission information. Referring to the IEEE 802.11a standard as a non-limiting example, if a carrier spacing is 312.5 KHz, and the Fourier Transforms are performed over 3.2 microseconds, then a 0.8 microsecond guard interval can be applied for ISI rejection. The guard "interval" could be the last $T_g$ seconds of an active symbol period that is prefixed to an OFDM symbol, making it a cyclic prefix. It is kept short for a fraction of "T," corresponding to the total length of the active symbol, yet longer than the channel impulse response. This helps reduce the ISI and Inter-Carrier Interference (ICI) and maintains subcarrier orthogonality. In this example, a time waveform appears periodic to the receiver over the duration of the FFT.

To reduce ICI, the OFDM symbol can be cyclically extended in the guard time to ensure that delayed replicas of the OFDM symbol can have an integer number of cycles within the FFT interval, as long as the delay is smaller than the guard time. As a result, multipath signals with delays smaller than the guard time would not produce ICI.

Multipath interference is caused when multiple copies of the transmitted signal arrive at the receiver at different times. It should be understood that an OFDM communications system reduces the effect of multipath interference by providing the ability to add signal redundancy in both frequency and time by the use of various coding algorithms. For example, with the IEEE 802.11a standard using OFDM, 48 carriers can be transmitted simultaneously. The coding gain can be provided using a one-half (½) convolutional encoder at the transmitter and later a Viterbi decoder. Data bits can be interleaved across multiple symbols and carriers. Lost data often is recoverable because of interleaving across the frequency and time space.

Increasing the data rate requires an increase in the symbol rate for a fixed number of carriers, fixed modulation scheme and fixed sample rate. For a single carrier system, complex equalizers and adaptive filters are required at the receiver to compensate for the magnitude and time distortions caused by the channel. The accuracy and dynamic range required of such equalizers and filters increases markedly as symbol times are decreased. However, in an OFDM system, for example, when 48 subcarriers are transmitted simultaneously, the symbol rate is effectively reduced by 48 times, significantly reducing the requirements of channel equalizers and filters. The reduced symbol rate of an OFDM system enables a robust communication link, resistant to ISI.

It should be understood that an OFDM receiver receives a sum of the different signals as subcarriers. The addition of a guard interval can further enhance performance in an OFDM system by ensuring that no symbol transitions occur during each received symbol time. For example, if an OFDM subcarrier is BPSK modulated, there would be a 180 degree phase jump at symbol boundaries. By choosing a guard interval that is longer than the largest expected time difference between the first and last multipath signals, such phase transitions can occur only during the guard time, meaning there are no phase transitions during the FFT interval. If the phase transitions of a delayed path occur within the FFT interval of the receiver, then the summation of the subcarriers of the first path with the phase modulated waves of the delayed path would no longer produce a set of orthogonal subcarriers, resulting in a certain level of interference.

FIG. 1A illustrates a high-level block diagram of the prior art transmitter 30 for the IEEE 802.11a OFDM modem described above, and includes a Forward Error Correction (FEC) Coder circuit 34 that receives a signal representing the data to be communicated 33, and encodes the signal with a forward error correction code as described above. The signal passes to an interleaving and mapping circuit 36 in which interleaving and frequency mapping occurs. An IFFT circuit 38 receives the interleaved and frequency mapped signal and creates multiple time domain carriers summed in a single in-phase/quadrature time domain sequence known as a symbol. A guard interval circuit 40 adds the guard interval. A symbol wave shaping circuit 42, for example a raised cosine filter, shapes the symbol waveform to limit its spectral content. Afterward, an In-phase/Quadrature (I/Q) modulator 44 processes the baseband I/Q signal, producing I/Q modulation, and also receiving a Local Oscillator (LO) signal from LO signal generator 46. Signal up-conversion to the final transmit carrier frequency occurs at mixer 48, which receives a local oscillator signal generated by LO signal generator 50. Afterward, the signal is amplified by a High Power Amplifier (HPA) 52, and the OFDM signal is transmitted through an antenna 54 on its carrier wave into the RF channel 31. Various stages of frequency filtering, for example between the I/Q Modulator 44 and mixer 48, and between the mixer 48 and HPA 52, and at the output of the HPA 52 are not shown in the block diagram.

FIG. 1B shows a high-level block diagram of the prior art receiver circuit 32 used in the exemplary IEEE 802.11a OFDM modem. The antenna 60 receives the OFDM signal from the RF Channel 31 on the carrier wave. It is amplified within a low noise amplifier (LNA) 62. Signal down-conversion occurs within a mixer 64, which also receives a local oscillator signal generated by an LO signal generator 66. An Automatic Gain Control (AGC) amplifier 68 provides automatic gain control to the down-converted signal to ensure the appropriate signal level is applied to the subsequent circuitry. The AGC circuit uses a feedback technique and is well known to those skilled in the art. In-phase and quadrature signal detection occurs within an I/Q Detect circuit 70, which also receives a local oscillator signal generated from a LO signal generator 72, which is also operative with an Automatic Frequency Control (AFC) clock recovery circuit 74, as illustrated. The AFC circuit adjusts the local oscillator 72 frequency to keep the I/Q detector tuned appropriately. The I/Q Detect circuit 70, AFC clock Recovery circuit 74, and LO signal generator 72 form a feedback loop as illustrated and known to those skilled in the art. The guard interval is removed within a GI circuit 76. The Fast Fourier Transform (FFT) is applied on the subcarriers as a reverse of the IFFT within an FFT circuit 78. Demapping and deinterleaving occur within a Demapping and Deinterleaving circuit 80. Forward error correction decoding occurs within an FEC decoder 82, which finishes the signal processing and recovers the original data as received communications data 83. It is thus evident that the function of the receiver circuit 32 as shown in FIG. 1B operates in a manner functionally the reverse of the transmitter circuit 30 shown in FIG. 1A.

As discussed above, OFDM communications systems can use FEC techniques and known interleaving and mapping techniques before IFFT processing as shown in FIG. 1A, and demapping and deinterleaving techniques followed by FEC decoding after FFT processing as shown in FIG. 1B.

These interleaving, coding, e.g., convolutional codes, including puncturing, and deinterleaving and decoding and related techniques often are integral parts of OFDM communications systems. As an example, a rate 1/2, K=7 convolutional code can be used as an industry standard code for forward error correction (FEC) during encoding. For purposes of understanding the present invention, a more detailed description of these basic system components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters range typically from 1 to 8, m ranges typically from 2 to 10, and the code rate typically ranges from 1/8 to 7/8 in non-limiting examples. Sometimes convolutional code chips are specified by parameters (n, k, L) with L equal to the constraint length of the code. Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes can be used also, which allow rates to be changed dynamically through software or hardware depending on channel conditions, such as rain or other channel impairing conditions.

An encoder for a convolutional code typically uses a Linear Feedback Shift Register (LFSR) or look-up table (LUT) for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, such as Viterbi decoding in one non-limiting example, which typically is more desirable. Sequential decoding allows both forward and backward movement through the trellis. Viterbi decoding as maximum likelihood decoding examines a receive sequence of given length, computes a metric for each path, and makes a decision based on the metric. Turbo codes are another example of a forward error correction scheme that can be used.

Puncturing convolutional codes is a common practice in some OFDM systems and can be used in accordance with non-limiting examples of the present invention. It should be understood that in some examples a punctured convolutional code is a higher rate code obtained by the periodic elimination of specific logic bits or symbols from the output of a low rate encoder. Punctured convolutional code performance can be degraded compared with original codes, but typically the data rate increases.

Some of the basic components that could be used as non-limiting examples of the present invention include the transmitter as described before that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio modem or transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

Also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

FIGS. 3A through 3D are graphs showing different representations of a conventional OFDM signal, such as produced by the prior art OFDM modem transmitter 30 shown in FIG. 1A.

Figure 3A:
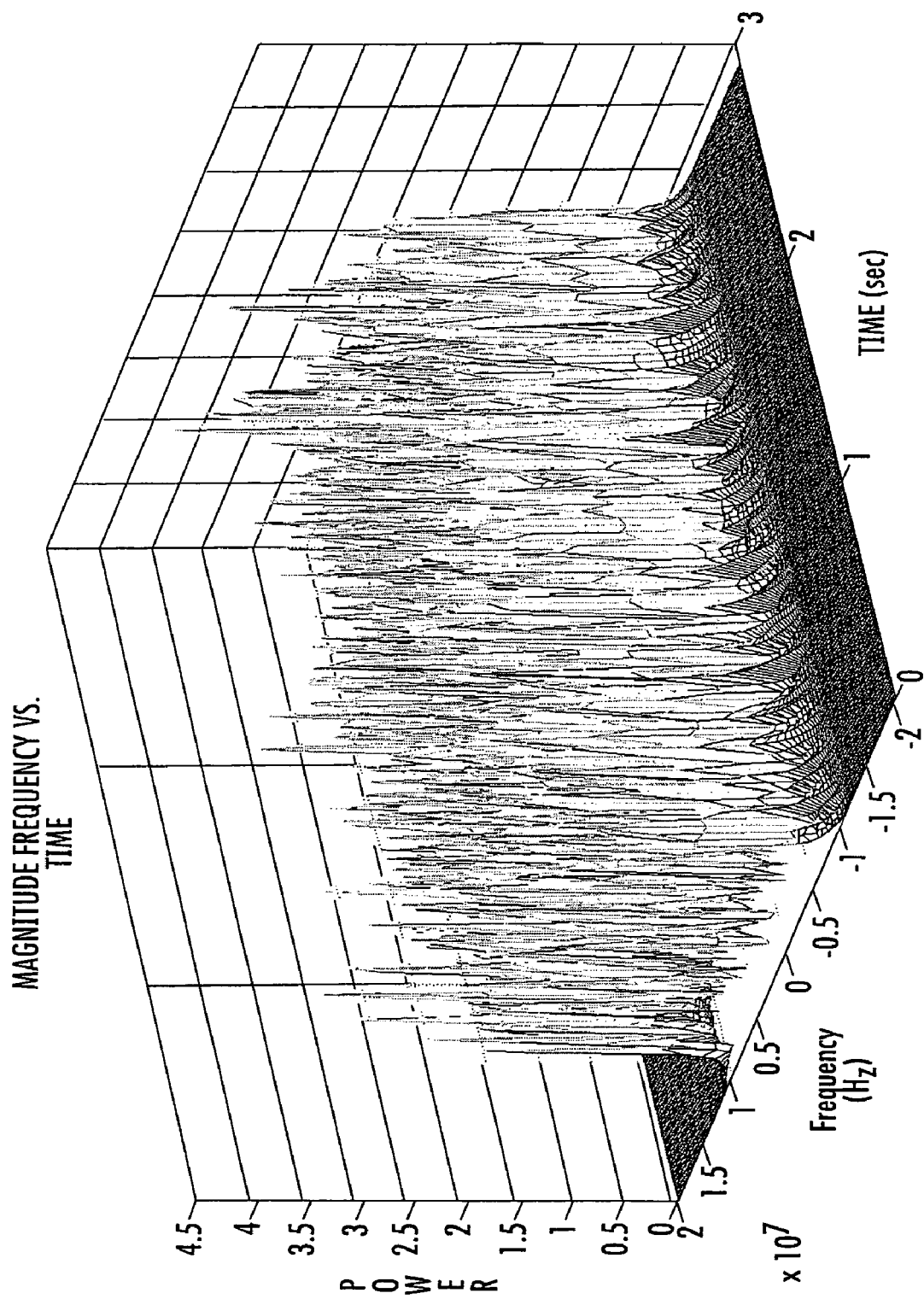
FIG. 3A is a graph showing a three-dimensional representation of a conventional OFDM signal.
Figure 3B:
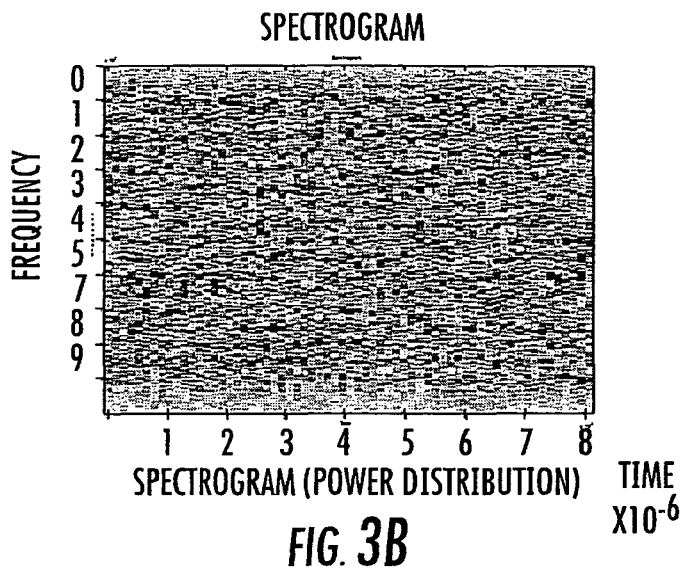
FIG. 3B is a spectrogram showing a power distribution for an example of a conventional OFDM signal such as shown in FIG. 3A.
Figure 3C:
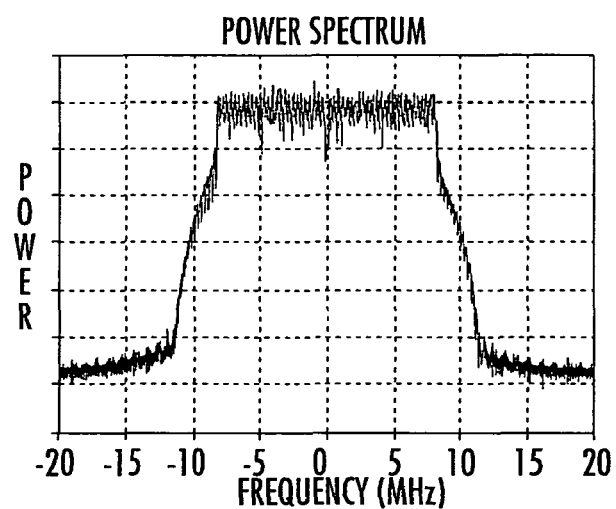
FIG. 3C is a graph showing a two-dimensional representation of a typical OFDM spectrum such as shown in FIG. 3A.
Figure 3D:
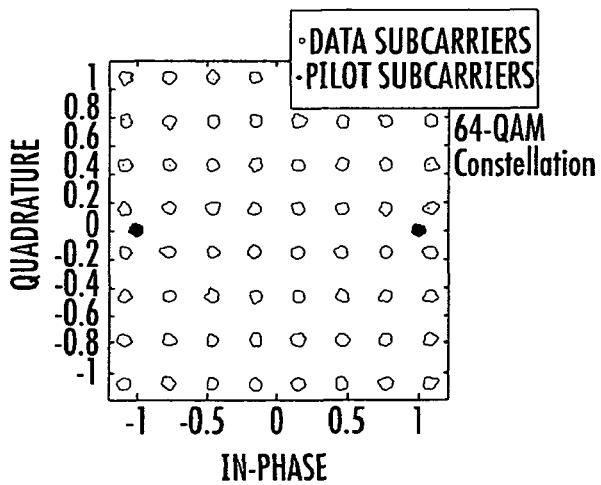
FIG. 3D is graph for a 64-QAM constellation of a conventional OFDM signal such as is shown in FIG. 3A.

FIG. 3A is a graph showing a three-dimensional representation of the OFDM signal with the frequency along one axis, time in seconds along another axis, and the "magnitude" or power on the vertical axis, forming a graph that indicates a magnitude vs. frequency vs. time representation. It is evident from FIG. 3A that the OFDM signal can be detected in the frequency domain. FIG. 3B is a graph showing a spectrogram or power distribution of the OFDM signal shown in FIG. 3A. FIG. 3C is a graph representing a two-dimensional OFDM spectrum of the three-dimensional OFDM signal shown in FIG. 3A. FIG. 3D shows a 64-QAM constellation for the OFDM signal shown in FIG. 3A. These graphs together depict the power distributed over multiple subcarriers. FIG. 4E is an explanation and equation representing total transmit power form a spectral density function.

FIGS. 4A through 4D are graphs showing a representation of the OFDM signal spectrum with different frequency subcarriers turned ON and OFF. In the upper left graph (FIG. 4A), the OFDM signal spectrum shows all 52 carriers turned ON, indicating in this non-limiting example an IEEE 802.11a standard using 52 carriers. In the upper right (FIG. 4B) 26 subcarriers are ON, showing the transmit power having a three decibel increase over the 52 carrier case in FIG. 4a, due to 26 carriers (subcarriers) being turned OFF. It should be understood that the total transmit power is equal to the area under the curve of the power spectral density function. The lower left and lower right graphs (FIGS. 4C and 4D) show thirteen subcarriers and six subcarriers turned ON respectively. There is transmit power increase of 6 decibels (6 dB) with 13 carriers turned ON and a 9 decibel (9 dB) increase in transmit power with 6 subcarriers turned ON. Because the peak power is 6 dB higher in the 13 subcarrier case, the distance in which the signal will be useable (for a free-space channel) will be doubled. Further increases in range may be realized as peak power is increased. FIG. 4d illustrates reduced Inter-Carrier Interference (ICI) due to the wide spacing of the subcarriers.

It should be understood that OFDM coded transmissions may be easily detected and received by unintended recipients by detection of data subcarriers and pilot tones. Addition of multiple sine waves or carriers with random amplitudes and phases to the waveform will cause it to approach a Gaussian distribution due to the central limit theorem. A signal having a Gaussian random distribution inherently has an enhanced Low Probability of Interception (LPI) and Low Probability of Detection (LPD) because it appears similar to additive white Gaussian noise (AWGN) to a receiver.

In accordance with a non-limiting example of the present invention, a modified transmitter as explained in detail below uses an IFFT to create multiple subcarriers located at specific frequencies. Only a small subset of the possible carriers need to be used at any one time to enhance power, reduce ICI, and enhance LPI and LPD. Subcarrier center frequencies can be changed at OFDM symbol times according to an encryption algorithm. Such an algorithm can generate a pseudo-random frequency hopping sequence and frequency hopping subcarriers in accordance with a non-limiting example of the present invention. Thus, fast-frequency hopping can change the subcarriers frequency for each OFDM symbol, and provide a one thousand (1,000) times faster frequency hopping than the Bluetooth standard, and ten times its data rate. Additional benefits can include a reduced ICI, a reduced ISI, and reduced transmitter overhead from the guard interval. The system, apparatus and method in accordance with a non-limiting example of the present invention allows a symbol-based randomization for the OFDM signal.

A Walsh transform can be applied to spread subcarriers over the frequency domain, in contrast with spreading over the time domain as with conventional COMA systems. Applying a Walsh transform before any IFFT circuit can reduce average power for enhanced LPI/LPD. Various aspects of the communications system can be readily varied for improved performance. With fewer subcarriers as compared to the IFFT size and the spreading sequence length, more processing gain may be realized from frequency domain spreading. Furthermore, LPI/LPD and Anti-Jamming (AJ) performance can be enhanced, and there can be higher SNR per subcarrier.

Increasing the sample rate also increases the bandwidth, data rate, and improves the LPI/LPD/AJ performance.

Figure 5:
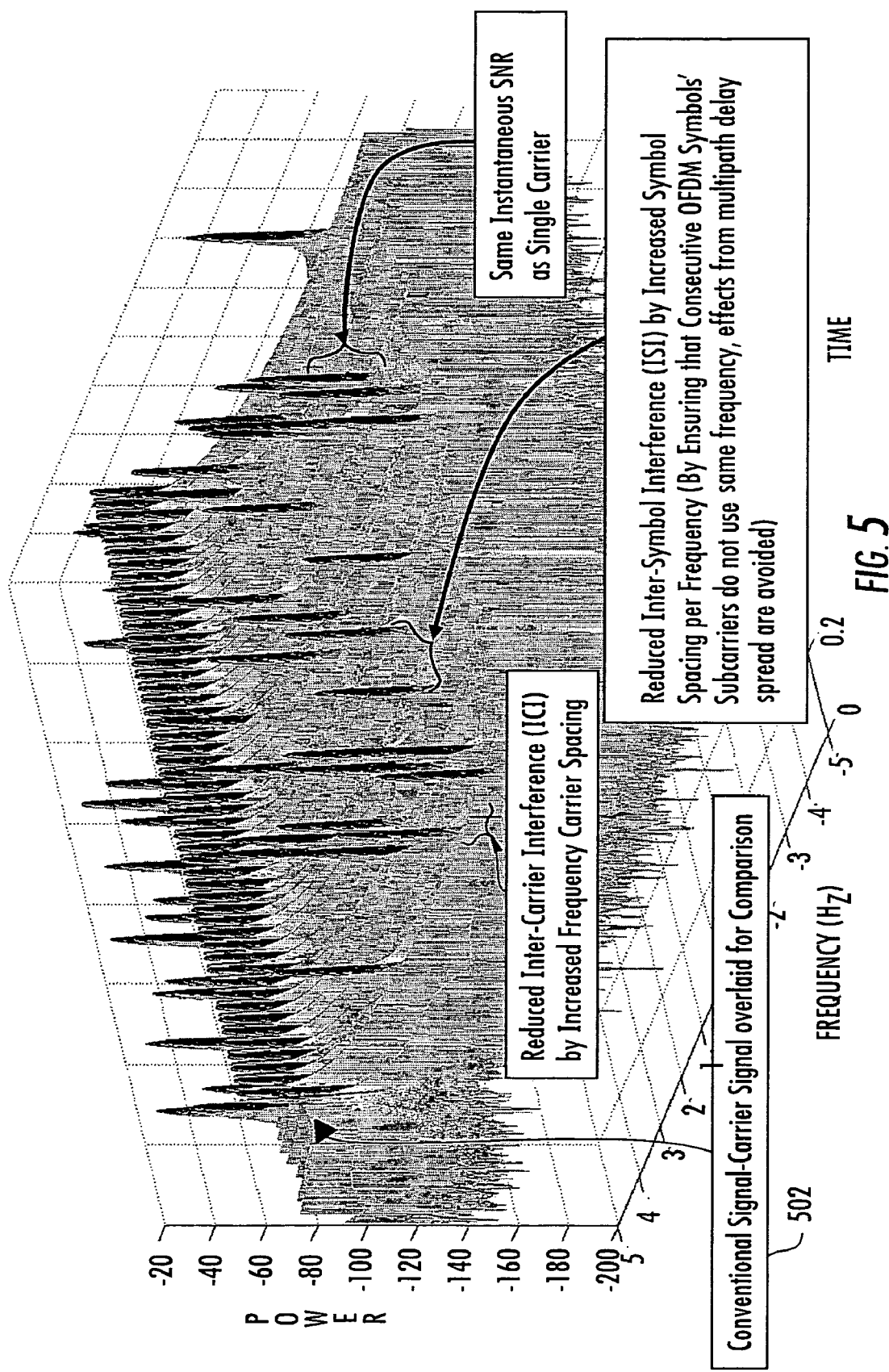
FIG. 5 is a graph showing a three-dimensional spectrogram (power vs. frequency vs. time) of Symbol-Based and Frequency Randomized subcarriers for the frequency hopping OFDM signal in accordance with a non-limiting example of the present invention, and also showing a conventional single carrier signal overlaid for comparison.

FIG. 5 is a graph representing a three-dimensional spectrogram of the symbol-based, frequency randomized subcarriers and showing a comparison in log scale with a magnitude vs. frequency vs. time representation 501. A conventional single frequency carrier signal 502 is overlaid for comparison and illustrated as a single carrier toward the lower frequency end of the band. This single carrier signal acts similarly to a jammer or interferer. The reduced Inter-Carrier Interference (ICI) is shown by an increased frequency carrier spacing. Reduced Inter-Symbol Interference (ISI) is shown by increased symbol spacing per frequency. This ensures that consecutive OFDM symbols subcarriers do not use the same frequency and the adverse effects from multipath delay spread are avoided. The same Instantaneous Signal-to-Noise ratio (SNR) as a single carrier is also illustrated.

Figure 6:
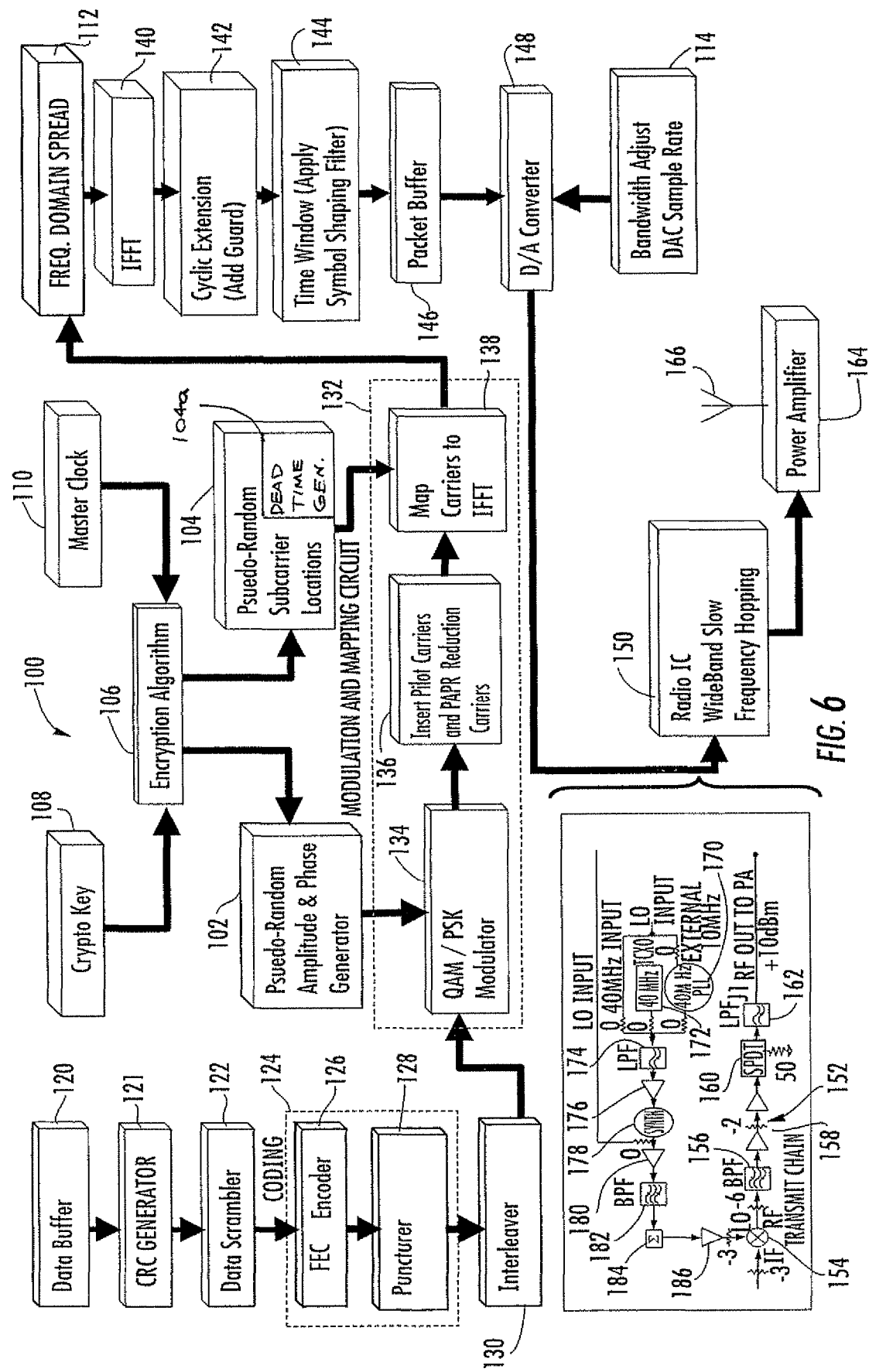
FIG. 6 is a high-level block diagram of a transmitter that can be used for generating the frequency hopping OFDM signal in accordance with a non-limiting example of the present invention.
Figure 7:
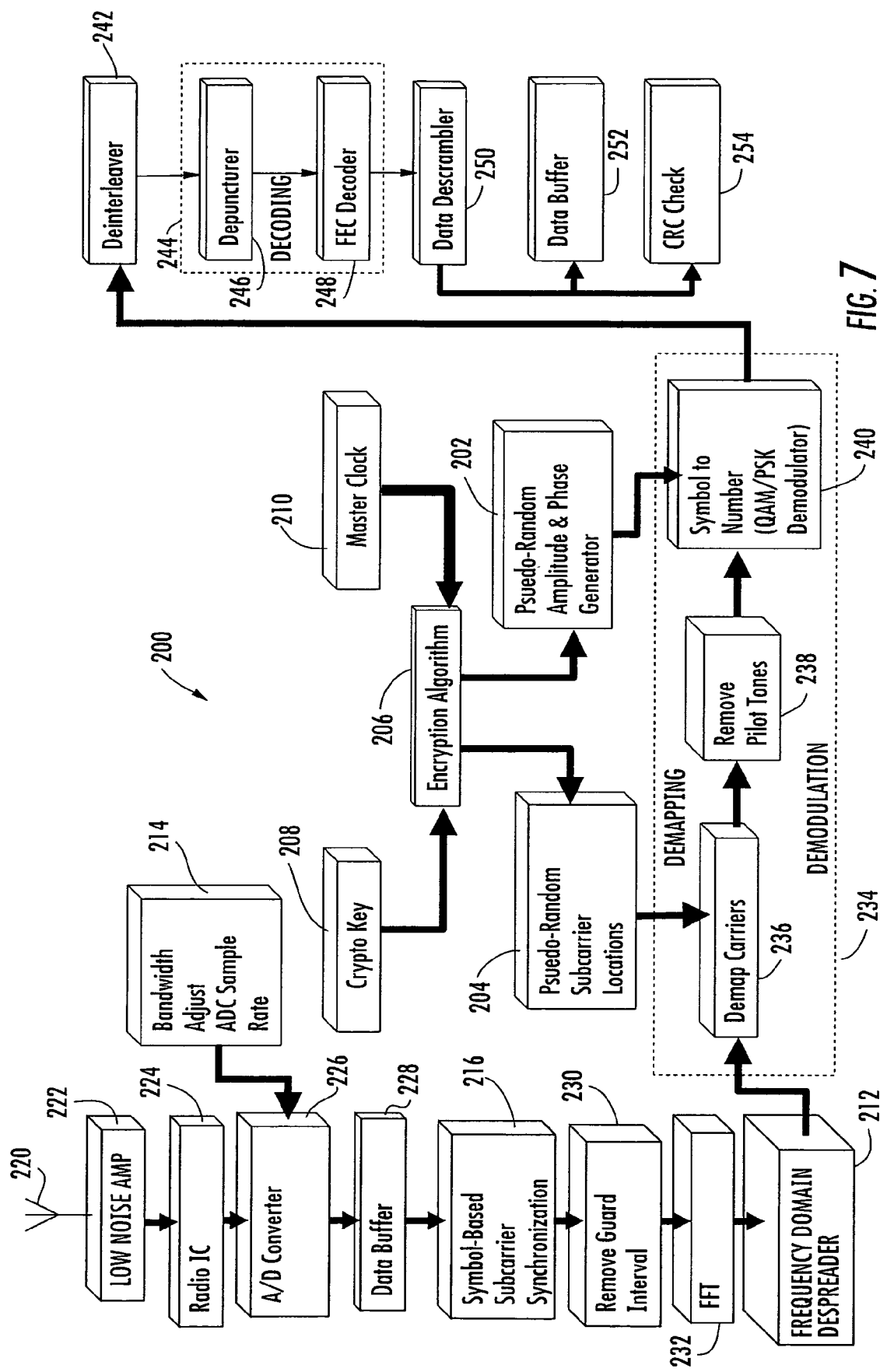
FIG. 7 is a high-level block diagram of a receiver that can be used for receiving and processing the transmitted frequency hopping OFDM signal in accordance with a non-limiting example of the present invention.

Referring now to FIGS. 6 and 7, there are illustrated respective functional block diagrams for a transmitter 100 (FIG. 6) and a receiver 200 (FIG. 7) that can be used in accordance with non-limiting examples of the present invention. The transmitter 100 as illustrated applies a frequency hopping algorithm to OFDM subcarriers and a frequency domain spreader, for example a Walsh transform, before an IFFT circuit.

Many of the high-level components of the illustrated transmitter 100 and receiver 200 are functionally similar to the components shown in the prior art modem of FIGS. 1A and 1B, but with further details and functional block components added to the transmitter and receiver block diagrams shown in FIGS. 6 and 7. For reference purposes, the description for the transmitter begins with the reference numerals in the 100 series and the description for the receiver begins with reference numerals in the 200 series.

Added functional components that aid in generating the frequency hopping, OFDM signal that can be Walsh transformed in accordance with a non-limiting example of the present invention include a Pseudo-Random Amplitude and Phase Generator 102 and Pseudo-Random Subcarrier Locations circuit 104. Both the Generator 102 and circuit 104 are operative with an Encryption Algorithm 106 and a Cryptographic and Key generator circuit (Crypto-Key) 108 and Master Clock 110. These components can be generally referred to as an encrypted pseudo-random signal generator. A Frequency Domain Spreader circuit 112 is located before an IFFT circuit, as illustrated, and is operable for frequency spreading the signal, such as by applying a Walsh transform. Also, a digital/analog converter can receive a signal from a Bandwidth Adjust DAC Sample Rate circuit 114 for removing spectral lines. These components are explained in further detail below.

As illustrated in FIG. 6, a signal is received within a data buffer 120 and passes through a CRC generator 121 and data scrambler 122. An FEC encoder circuit shown by the dashed lines at 124 can include a Forward Error Correction encoder 126, for example, a convolutional encoder and puncturer circuit 128. The encoded signal is interleaved within an interleaver circuit 130. The signal passes into a modulation and symbol mapping circuit shown generally by the dashed lines at 132. This modulation and symbol mapping circuit 132 includes a QAM/PSK modulator 134 and Insert Pilot Carriers and PAPR Reduction Carriers circuit 136 that inserts pilot carriers and PAPR reduction carriers into the signal. PAPR in this example corresponds to Peak-to-Average Power Ratio. Carriers are mapped to the IFFT in a matrix operation in a subcarrier mapper circuit 138.

The Encryption Algorithm 106 is operative not only with the Crypto-Key circuit 108 and the Master Clock 110, but also the Pseudo-Random Amplitude and Phase Generator 102, which generates pseudo-random signals to the QAM/PSK Modulator 134 in accordance with a non-limiting example of the present invention. The Pseudo-Random Subcarrier Location circuit 104 is also operative with the Subcarrier Mapper circuit 138 and receives signals from the Encryption Algorithm 106. The OFDM Subcarriers are frequency hopped quickly by means of such circuits.

In accordance with a non-limiting example of the present invention, the Frequency Domain Spreader circuit 112 is located before the IFFT circuit 140 and applies the Walsh transform in the frequency domain. If the Frequency Domain Spreader circuit 112 were located after the IFFT circuit 140, then the Walsh or other function would force a time-domain spreading. It should be understood that the Frequency Domain Spreader circuit 112 and IFFT circuit 140 can typically be considered with the modulation and mapping circuit 132 as an OFDM modulation circuit or OFDM modulation and mapping circuit. In accordance with a non-limiting example of the present invention, the spreading resulting from application of the Walsh transform occurs in the frequency domain. A cyclic extension as a guard interval can be added within a Cyclic Extension circuit 142. A symbol-shaping filter 144 such as a Finite Impulse Response (FIR) filter, cosine filter, or raised cosine filter can be operative as a "Time Window" for symbol shaping in conjunction with the Cyclic Extensions. A packet buffer 146 receives the signals, and after buffering, the signals are converted to analog signals in a digital/analog converter 148. The D/A converter 148 also receives from a Bandwidth Adjust DAC Sample Rate circuit 114 a signal for further processing that removes spectral lines. The D/A Converter 148 passes signals to a Radio Integrated Circuit (IC) Wideband Slow Frequency Hopping circuit 150. The RF carrier can be subjected to a pseudo-random frequency hopping algorithm for enhanced bandwidth, and is operative also as a frequency up-converter, as illustrated.

Basic components of the frequency up-converter circuit 150 can include a transmit chain circuit 152 that receives the signal into a mixer 154. The signal passes through a Bandpass Filter 156, a series of amplifiers 158 and through a Single Pole Double Throw (SPDT) switch 160. After switching, a low pass filter 162 filters the signal. The radio frequency signal is amplified by the Power Amplifier 164 for subsequent transmission through antenna 166. Other components in the circuit 150 include a Phased-Lock Loop circuit 170, a 40 MHz signal generator 172 as a non-limiting example, a low pass filter 174, an amplifier 176, a synthesizer 170, another amplifier 180, a bandpass filter 182, a summer circuit 184, and another amplifier 186 that connects to the mixer 154. The component parts of frequency upconverter circuit 150 may be used to affect a low rate frequency hopping scheme, where the entire OFDM baseband waveform is frequency translated to different center frequencies. Such slow frequency hopping can further guard against interference and provide an additional level of encryption if the slow hopping sequence is designed as such.

The transmitter 100 as described is a non-limiting example and many other types of transmitters could be used. It should be understood that with advances in DSP and other circuit functions, processing can possibly occur directly at baseband.

It should also be understood that the subcarrier mapper circuit 138 maps carriers to the IFFT circuit 140. For example, if the IFFT circuit 140 has an input with a 64 sample signal in the frequency domain, it would give a 64 sample signal in the time domain as a matrix operation. The subcarrier mapper circuit 138 can change the order of the vectors to position symbols on arbitrary subcarriers and apply zero to other subcarriers. For example, some of the samples in a 64 sample vector would be zeros, meaning they would not show up in the frequency domain if they are OFF. Any that are ON or non-zero will change location with every IFFT cycle (once per symbol) to produce the frequency hopping OFDM signal. The nature of the frequency hopping for the OFDM signal is generated by the Encryption Algorithm 106 and the Pseudo-Random Subcarrier Locations circuit 104 and the Pseudo-Random Amplitude and Phase Generator 102. The QAM/PSK Modulator 134 aids in producing the constellation amplitude and phase.

One of the aspects of this invention involves obscuring to an unintended receiver that the data has been encrypted. To obscure the encryption, three unknowns are produced by the transmitter. For example, there is a) the unknown of the transmitted amplitude and phase; b) the unknown of the pseudo-random amplitude and phase; and c) the unknown of the channel amplitude and phase. Because there are three unknowns, it is not possible to know which signal is transmitted with an encryption algorithm, based on the Cryptographic Key and Master Clock.

The Frequency Domain Spreader circuit 112 operates as a matrix operation. For example, if a 64 IFFT circuit 140 is employed, then a 64×64 Walsh Matrix (as a non-limiting example) can be used to frequency-spread the subcarriers and provide processing gain. An input vector would be multiplied by the Walsh matrix. It should be understood that a Walsh matrix is a square matrix with dimensions that can be a power of "two." The entries are positive or negative one (+1, −1). The Walsh matrix can be obtained from a Hadamard Matrix that is defined by a recursive formula of the same dimension by arranging rows such that the number of sign changes is in increasing order, i.e., sequential ordering. Each row of a Walsh matrix corresponds to a Walsh function. The ordering of rows in a Walsh matrix can be derived from ordering a Hadamard matrix by applying a bit-reversal permutation and a Gray code permutation. The Walsh functions form an orthogonal basis of a square that is integratable on a unit interval. Thus, it can generate statistically unique sets of numbers suitable for use in encryption, also known as "pseudo-random and noise codes." The multiplication may be implemented efficiently as a series of additions and subtractions.

The Bandwidth Adjust DAC Sample Rate circuit 114 is operative with the D/A converter 148 and can adjust the sample rate and remove spectral lines. As a result, it is harder to detect the waveform with a Spectrogram. It should be understood that the transmitter 100 as described is operative to form a Frequency Hopping OFDM signal with a Walsh transform. For example, if an IFFT is used with 64 samples per symbol, the frequency location of each subcarrier can be changed every 64 samples. As an example, if an IFFT is computed every four microseconds, then frequency hopping on all 64 carriers can occur every four microseconds to impart a fast hopping rate. Because this can be accomplished symbol-by-symbol, the frequency hopping OFDM communications system as described can also be termed a Symbol-Based Randomized OFDM because the subcarrier frequency locations are randomly changed. Another receiver would not be able to determine the subcarrier locations without the Encryption Algorithm and related circuits, and a full synchronization.

FIG. 7 shows a high-level functional block diagram of a receiver 200 that can be used in accordance with a non-limiting example of the present invention. Similar components that are used in the block diagram of FIG. 6, such as an Encryption Algorithm circuit, Cryptographic Key circuit, Master Clock, Pseudo-Random Amplitude and Phase Generator, Pseudo-Random Subcarrier Locations circuit, and Bandwidth Adjust ADC Sample Rate circuit are given similar reference numerals as used in FIG. 6, except they are now placed in the 200 series. This receiver circuit 200 also includes the addition of a Symbol-Based Subcarrier Synchronization circuit 216. It also uses a Frequency Domain Despreader circuit 212 instead of a Frequency Domain Spreader circuit 112 as in the transmitter 100 of FIG. 6.

Other high-level components illustrated for this receiver circuit 200 include an antenna 220, a low noise amplifier (LNA) 222, and Radio Integrated circuit down-converter 224, which can process a frequency hopping carrier signal in reverse if it had been processed for wideband by the Radio IC Wideband Slow Frequency Hopping circuit 150 shown in the transmitter 100 of FIG. 6. The Analog/Digital Converter 226 receives an IF or baseband signal from the down-converter 224, and a signal from the Bandwidth Adjust ADC Sample Rate circuit 214 and reverses the process used at the transmitter 100. The signal is forwarded to the Data Buffer 228 and Symbol-Based Subcarrier Synchronization circuit 216, which synchronizes the subcarriers for further processing. The Guard Interval circuit 230 removes the guard interval and the signal is processed with the Fast Fourier Transform as an OFDM demodulator in an FFT circuit 232. The Inverse Walsh Transform is applied in an Inverse Walsh Transform circuit 212. A subcarrier demapper and demodulation circuit is shown by dashed lines at 234 and performs an inverse mapping operation to the subcarriers in subcarrier demapper circuit 236, removes the pilot tones in a pilot remove circuit 238 and demodulates the signal in a Symbol to Number (QAM/PSK) Demodulator circuit 240. The deinterleaver circuit 242 deinterleaves the signal. A decoding circuit is shown by dashed lines at 244 and is operative for depuncturing within depuncture circuit 246 and Forward Error Correction (FEC) decoding such as Viterbi decoding within a FEC decoder such as a Viterbi decoder 248. Data descrambling occurs at a Data Descrambler 250, followed by data buffering in data buffer 252 and processing for a CRC check by CRC circuit 254.

The transmitter 100 and receiver 200 shown in FIGS. 6 and 7 can generate and receive a signal that is a fast-carrier frequency hopping signal. This hopping can be much faster than a conventional Bluetooth system that hops frequencies at 1600 hops/second over a 80 MHz radio frequency bandwidth using a single carrier having a 1 MHz bandwidth. It should also be understood, for example, as shown in the graphs of FIG. 4, that a change in signal-to-noise ratio (S/N) can be based on the number of subcarriers and can be used as a method of varying the range of the instantaneous subcarrier signal-to-noise ratio versus that data rate in an adaptive wireless communications system.

For example, the receiver 200 could measure the received Signal-to-Noise ratio per subcarrier, for example, by using channel estimation symbols, a preamble, or a special channel estimation packet. Information can be passed back to the transmitter as a "channel mask", specifying the number of subcarriers to "turn-off" and the possible frequency locations of interferers as channel impairments such that the transmitter 100 could use the negotiated channel mask to avoid transmission on any undesirable frequencies. In one example, ten carriers are turned on simultaneously over a 100 MHz bandwidth, and each carrier is transmitted for 640 nanoseconds (corresponding to a 1/FFT rate), such that each carrier can hop 1,562,500 times per second. This is about a one thousand times faster hopping than the Bluetooth protocol and can provide more than ten times the data rate.

The transmitter 100 can create multiple subcarriers located at specific frequencies and can generate a pseudo-random frequency hop for each subcarrier frequency by applying the frequency hopping algorithm as explained before. The IFFT circuit 140 creates multiple subcarriers located at specific frequencies. In accordance with a non-limiting example of the present invention, only a small subset of all possible subcarriers need to be used at any one time, although all subcarriers can be used if necessary. For example, as in the example discussed above, instead of 64 subcarriers, only 10 subcarriers can be used in this non-limiting example, giving in that example the 1,562,500 hops per second.

The subcarrier center frequencies can be changed at the OFDM symbol rate using the encryption algorithm for the pseudo-random frequencies. This occurs at the modulation and mapping circuit 132 in which the carriers are mapped to the IFFT. The center frequencies of the subcarriers can appear random because of the frequency hopping algorithm. The symbol time duration can be very short as noted above, and therefore, each subcarrier would appear for a short time at any specific frequency.

The guard time can be reduced or eliminated by ensuring that consecutive symbols do not contain subcarriers at the same frequency location. For example, in prior art systems, if two symbols are back-to-back on the same frequency, multipath signals could arrive at different times at the same location. By using the system and circuits shown in FIGS. 6 and 7, these signals do not appear on the same frequency and the signal would typically not be affected by multipath, thus preventing Inter-Symbol Interference (ISI) and substantially reducing required guard time, reducing transmission overhead, and increasing data rate.

It is possible using the transmitter 100 and receiver 200 as shown in FIGS. 6 and 7 to eliminate or substantially reduce guard time, e.g. "guard interval." Also, it should be understood that an additional guard can be added by modifying the frequency hopping algorithm such that no frequency can be used twice in a row for consecutive symbols, and thereby preventing Inter-Symbol Interference (ISI) because of multipath channel effects. As noted before, this eliminates or substantially reduces the required guard interval, reduces transmission overhead, and increases the data rate.

It is also possible to dynamically add and remove subcarriers depending on the required data rate. The minimum carrier spacing can increase to reduce the Inter-Carrier Interference (ICI) and provide robustness to jamming i.e. anti-jamming (AJ) capability, because of the frequency hopping signal. As long as carriers are not transmitted next to each other in the frequency domain, the Inter-Carrier Interference will be reduced.

It is also possible for the carrier frequency to hop pseudo-randomly and cover a wide bandwidth. This can be accomplished by the Radio IC Wideband Slow Frequency Hopping circuit 150 shown in FIG. 6 and operative as a frequency up-converter circuit.

A "dead-time" pseudo-random generator indicated at 104a in FIG. 6 can be introduced into the system to decrease "on" time, and the output spacing between symbols can be increased. The spacing can be varied using the pseudo-random generator to prevent spectral lines and reduce cyclostationary statistics of the signal. This type of system can be implemented without an output sample control. The system can wait a random amount of time before transmitting. By removing the spectral lines, it is more difficult for other systems to detect the transmitted communications. The term cyclostationary can refer to the mean standard deviation as a second order statistic of the signal. The output sample control can refer to control at the D/A Converter 148.

The subcarrier constellation amplitude and phase values can also be varied pseudo-randomly using the generator 102 operative with the modulator 134 as shown in FIG. 6. For example, pseudo-random amplitude and phase values can be generated using the encryption algorithm. The pseudo-random amplitude and phase values can be added to the intended amplitude and phase values before transmission. By adding the pseudo-random amplitude and phase values to each subcarrier, the symbol constellation is no longer a standard QAM/PSK. If the transmitter signal is detected by an unintended receiver, that receiver would not be able to demodulate the signal because there would be too many unknowns. For example, the transmitted or intended amplitude and phase would be an unknown, together with the pseudo-random amplitude and phase that is added to the signal, and a further unknown being the channel amplitude and phase for the multipath. This results in three unknowns. The pseudo-random amplitude and phase values would appear as a typical random channel effect to the unauthorized or unintended receiver.

It should be understood that these algorithms can be added to Software Defined Radios (SDR) and can be implemented with some changes to vary data rate and modulation. The data rates, bandwidth, transmission power and LPI/LPD performance can be improved by varying the subcarrier modulation scheme, sample rate, IFFT size, IFFT duration and the number of subcarriers used per OFDM symbol.

As shown in FIG. 6, a Walsh transform can be applied in the frequency domain for frequency spreading, since it is applied before the IFFT circuit 140 using the Frequency Domain Spreader circuit 112. It is known that Walsh transforms are typically used in communications systems such as CDMA for time-domain spreading and for creating orthogonal codes for multiple access schemes. The Walsh Transform can be used in the system, apparatus, and method of the present invention to spread subcarriers over the frequency domain. This can provide a significant reduction in the average power (dBm/Hz/sec) for enhanced LPI/LPD performance, allowing more transmit power within the same FCC spectral mask and reducing the effect of Frequency Selective Fading by providing a frequency-domain processing gain. It also provides additional anti-jamming (AJ) robustness. Also, out-of-band noise (OBN) emissions can be reduced similar to time-windowing because of the steeper "roll-off" caused by the Walsh transform. The Walsh transform as a matrix is made up of only positive and negative ones (+1, −1) and requires only additions and subtractions, and no multiplications. This would allow a trade-off for the number of carriers versus the data rate versus the transmit power and distance for the same FCC spectral mask. In the Walsh transform, matrix rows can be exchanged with each other. The transform would still be orthogonal at the receiver 200. These row permutations can be performed to increase further the LPI.

It should be understood that OFDM is susceptible to Frequency Selective Fading because of multipath. The Walsh transform can provide processing gain to the system and robustness against frequency selective fading.

The system, apparatus and method as described provides a very fast frequency hopping by changing subcarrier frequency locations, for example, at the OFDM symbol rate. Thus, it can provide a reduced spectral density over time (decibel/hertz/second) in order to provide a Low Probability of Interception (LPI) and Low Probability of Detection (LPD). The system as described is much faster than Bluetooth systems, and makes the transmission within the FCC spectral mask possible at greater distances. It also eliminates or substantially reduces a guard interval by ensuring that subcarriers do not appear on the same frequency for consecutive OFDM symbols. The system also provides robustness against Inter-Symbol Interference (ISI) due to multipath. The Walsh transform can be applied in the frequency-domain to spread the frequency-hopping subcarriers over the spectrum and reduce the power spectral density (decibels over hertz) to improve LPI/LDP performance or help comply with FCC spectral mask requirements. It can also provide a processing gain against frequency selective fading and provide robustness against jamming.

Figure 8A:
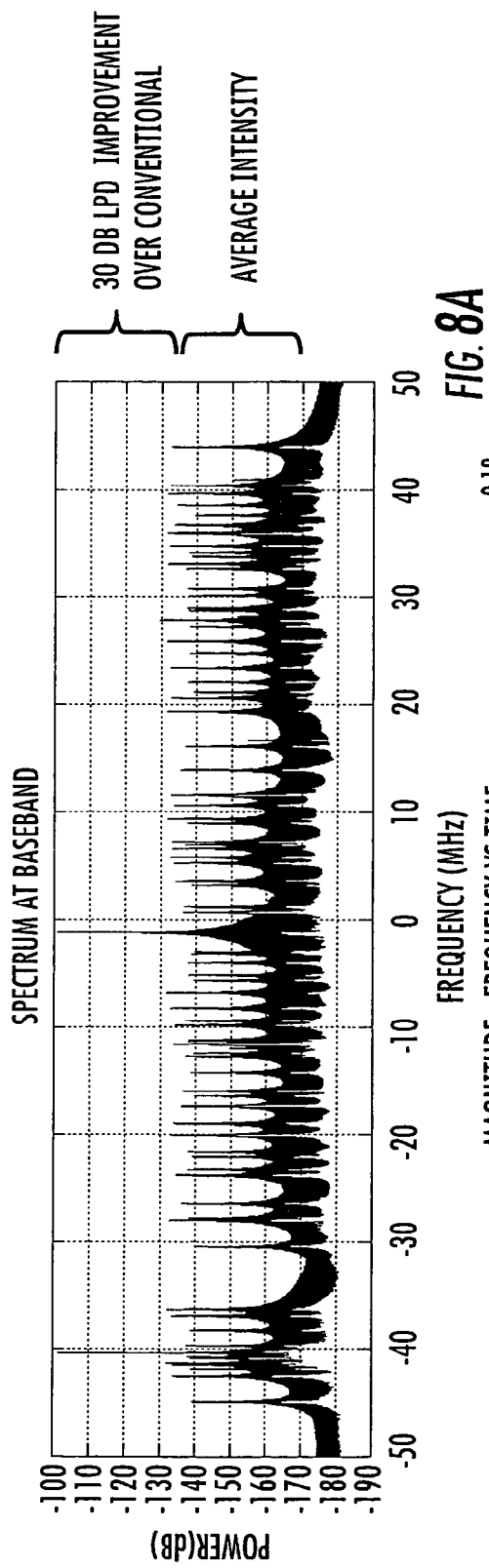
FIGS. 8A and 8B are graphs showing a spectral comparison for the frequency hopping OFDM signal and showing the LPD improvement in accordance with a non-limiting example of the present invention.
Figure 8B:
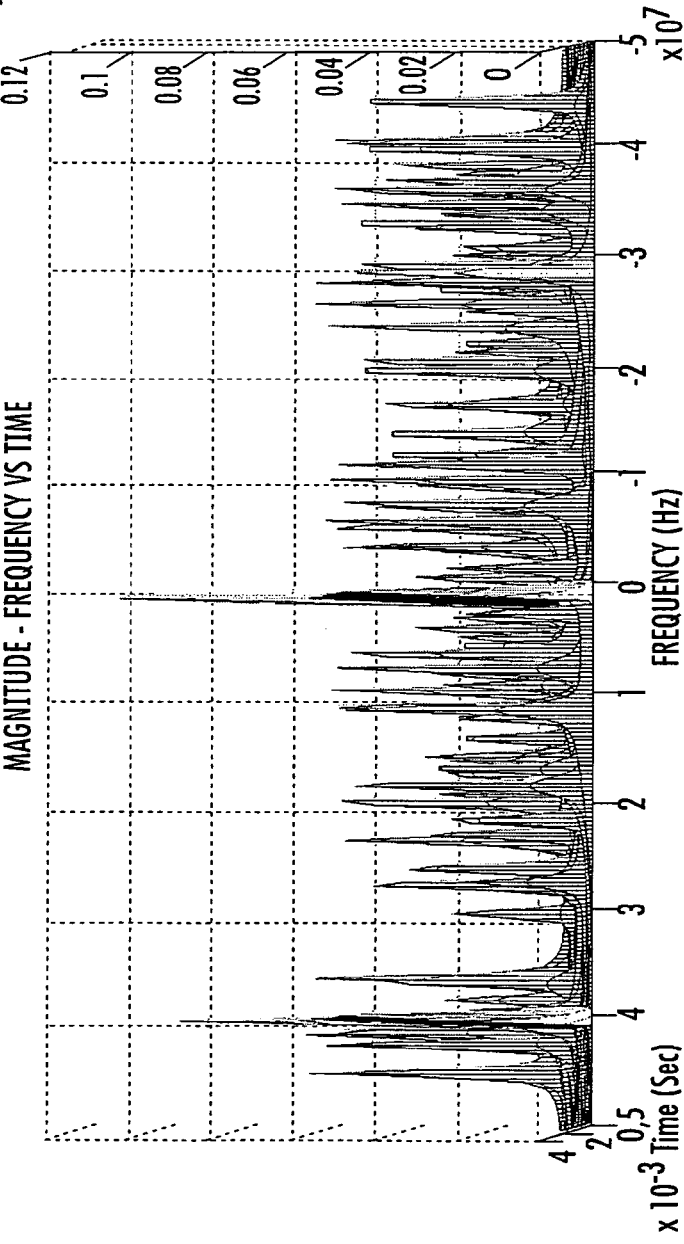

Referring now to FIGS. 8A and 8B, there are shown a spectral comparison between a conventional single-carrier waveform and the symbol-base randomized frequency hopping subcarriers. As shown in the upper graph, the frequency is on the horizontal axis and the relative power in decibels is on the vertical axis. A spectrum is shown at baseband and the average intensity is illustrated together with the 30 decibel LPD improvement over a conventional system. More power can now be transmitted within the same FCC spectral mask. It is possible for a radio station or other transmitter that transmits digital data to frequency hop its OFDM signal and reduce the average power in accordance with a non-limiting example of the present invention.

Figure 9:
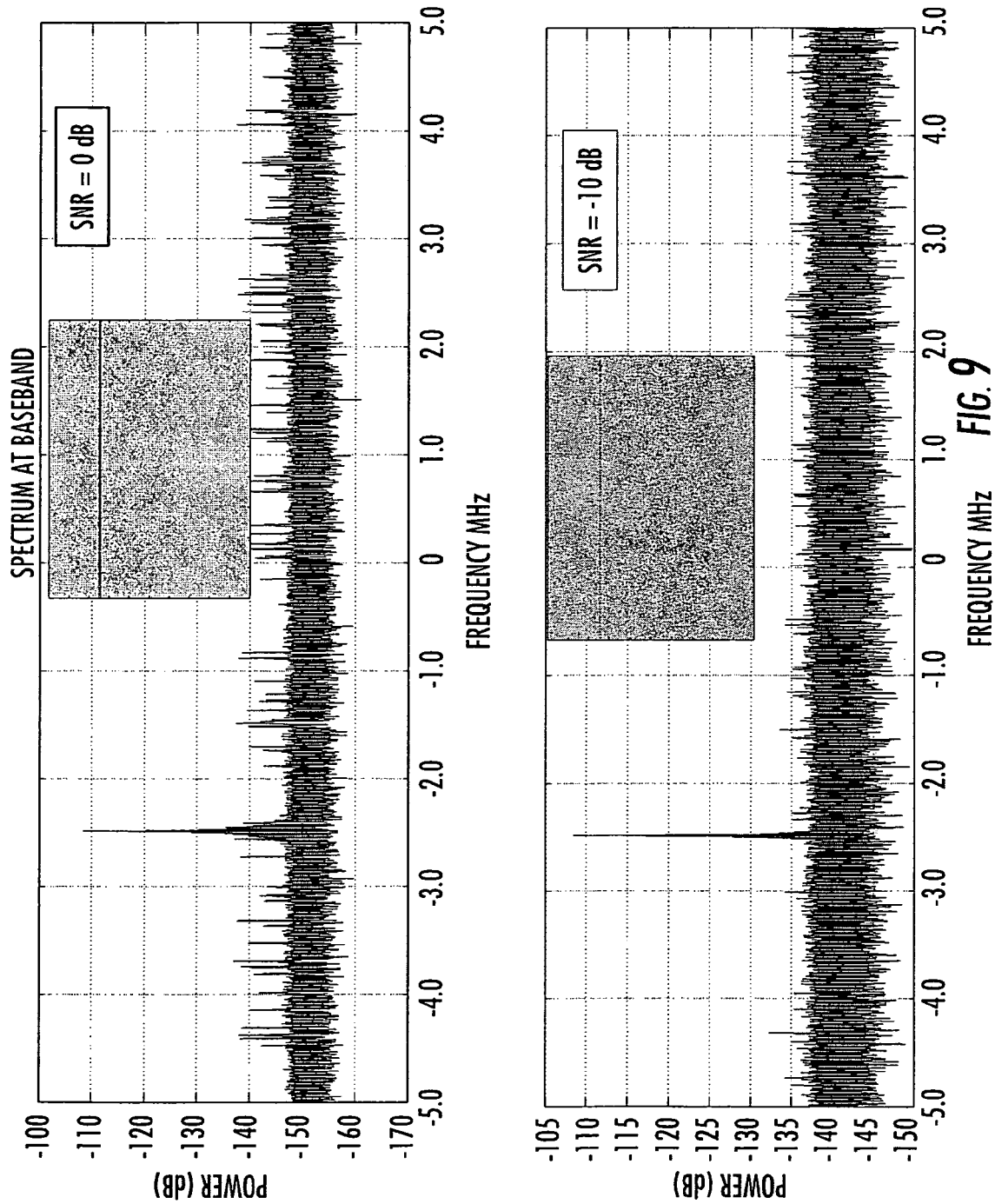
FIG. 9 are graphs showing a spectral comparison in noise for the frequency hopping OFDM signal and a signal modified to reduce its detectability in accordance with a non-limiting example of the present invention.

FIG. 9 graphs show a spectral comparison in noise such as in close proximity to a transmitter. A single carrier is compared to the frequency hopping OFDM subcarriers.

Figure 10:
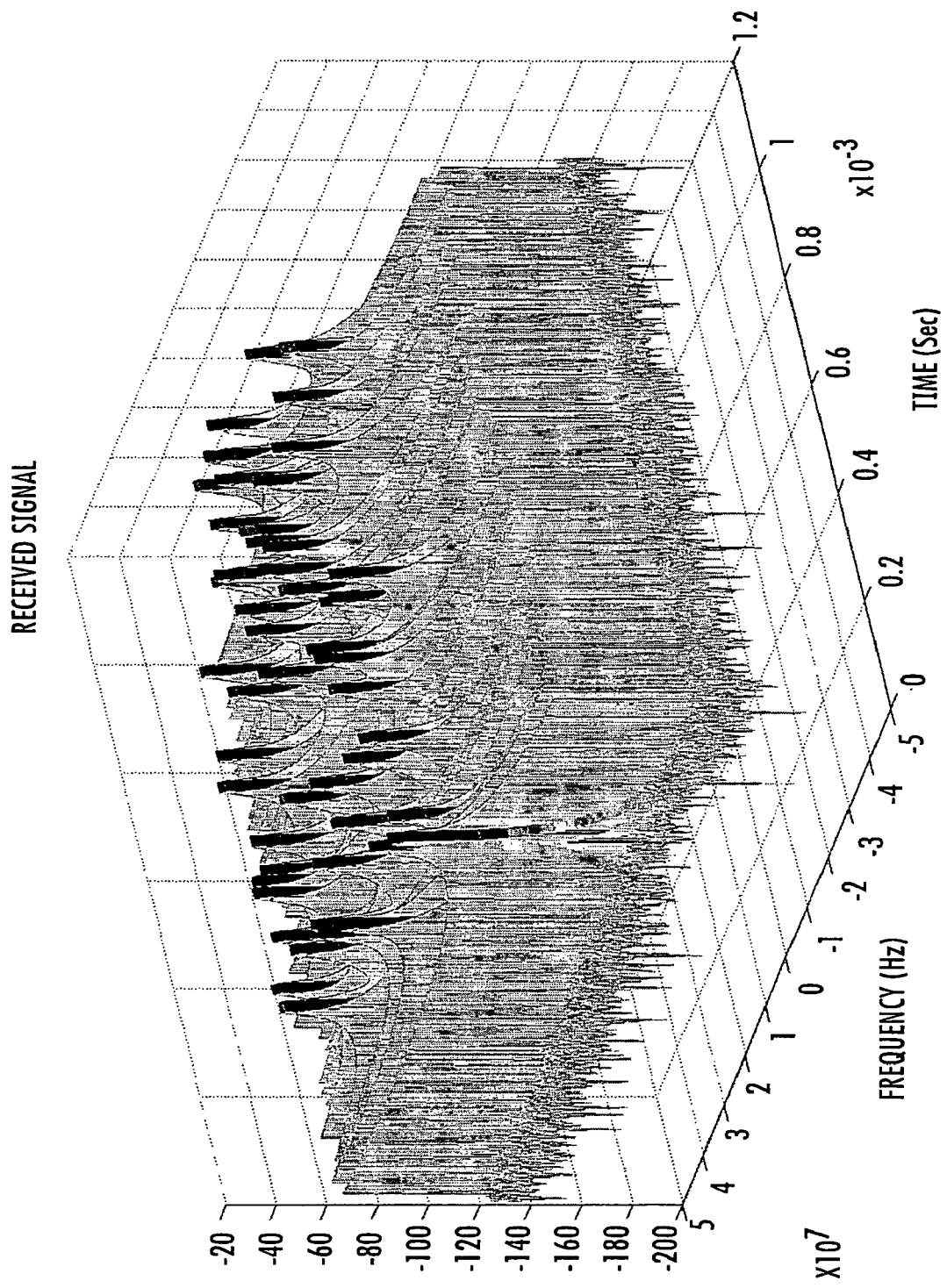
FIG. 10 is a graph showing a three-dimensional representation of the frequency hopping OFDM signal before a Walsh transform in accordance with a non-limiting example of the present invention.

FIG. 10 is a graph showing a transmitted frequency hopping OFDM signal in three-dimensions before the Walsh transform in accordance with a non-limiting example of the present invention. The frequency hopping OFDM signal is illustrated.

Figure 11:
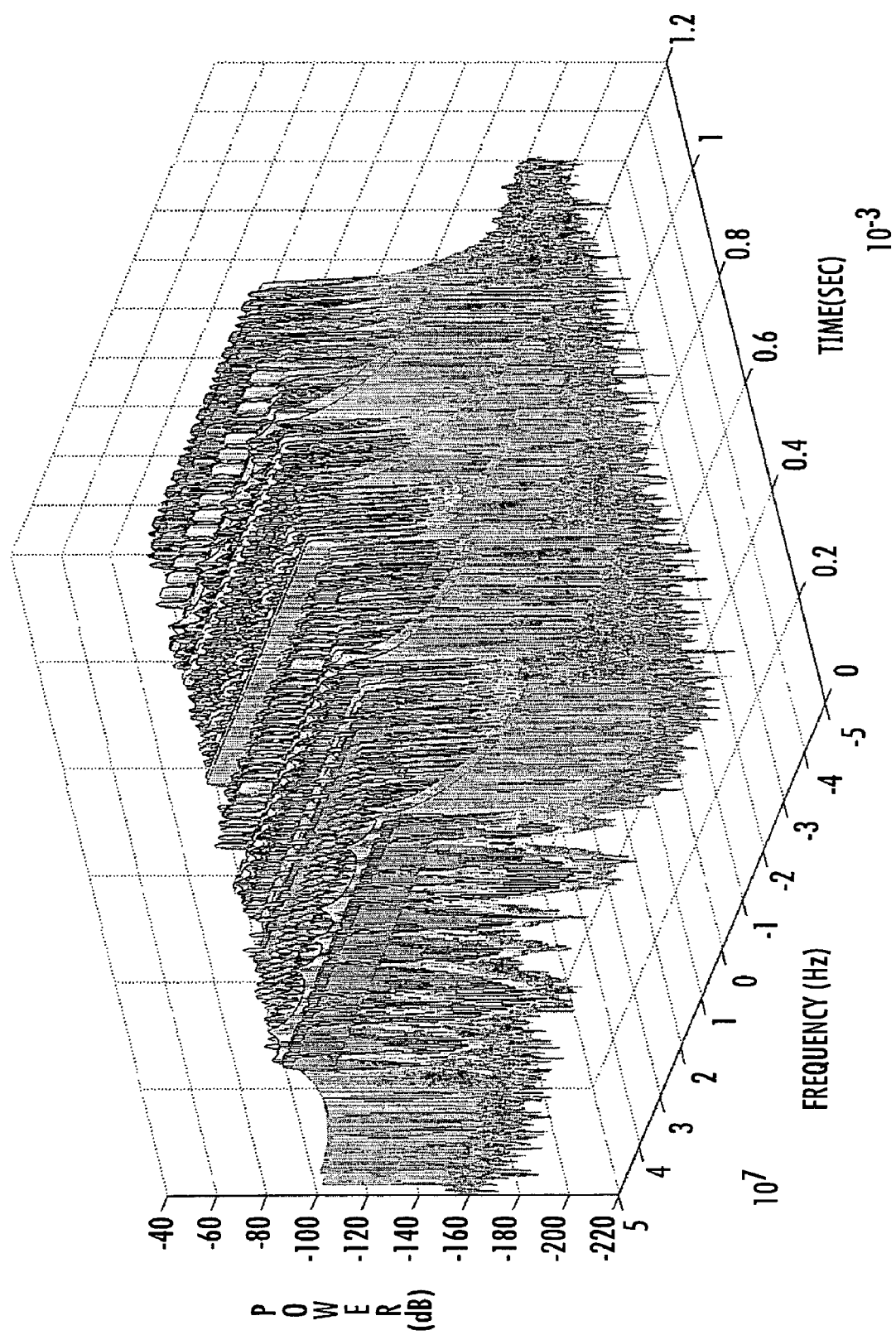
FIG. 11 is a graph showing a three-dimensional representation of the frequency hopping OFDM signal after the Walsh transform in accordance with a non-limiting example of the present invention.

FIG. 11 is a three-dimensional graph showing the transmitted frequency hopping OFDM signal after the Walsh transform in which the power is reduced even more in accordance with a non-limiting example of the present invention. Each subcarrier has the Walsh transform applied in the frequency domain. The subcarriers are "smeared" or spread over frequency to reduce the power per Hertz to a greater extent than before the Walsh transform.

Figure 12:
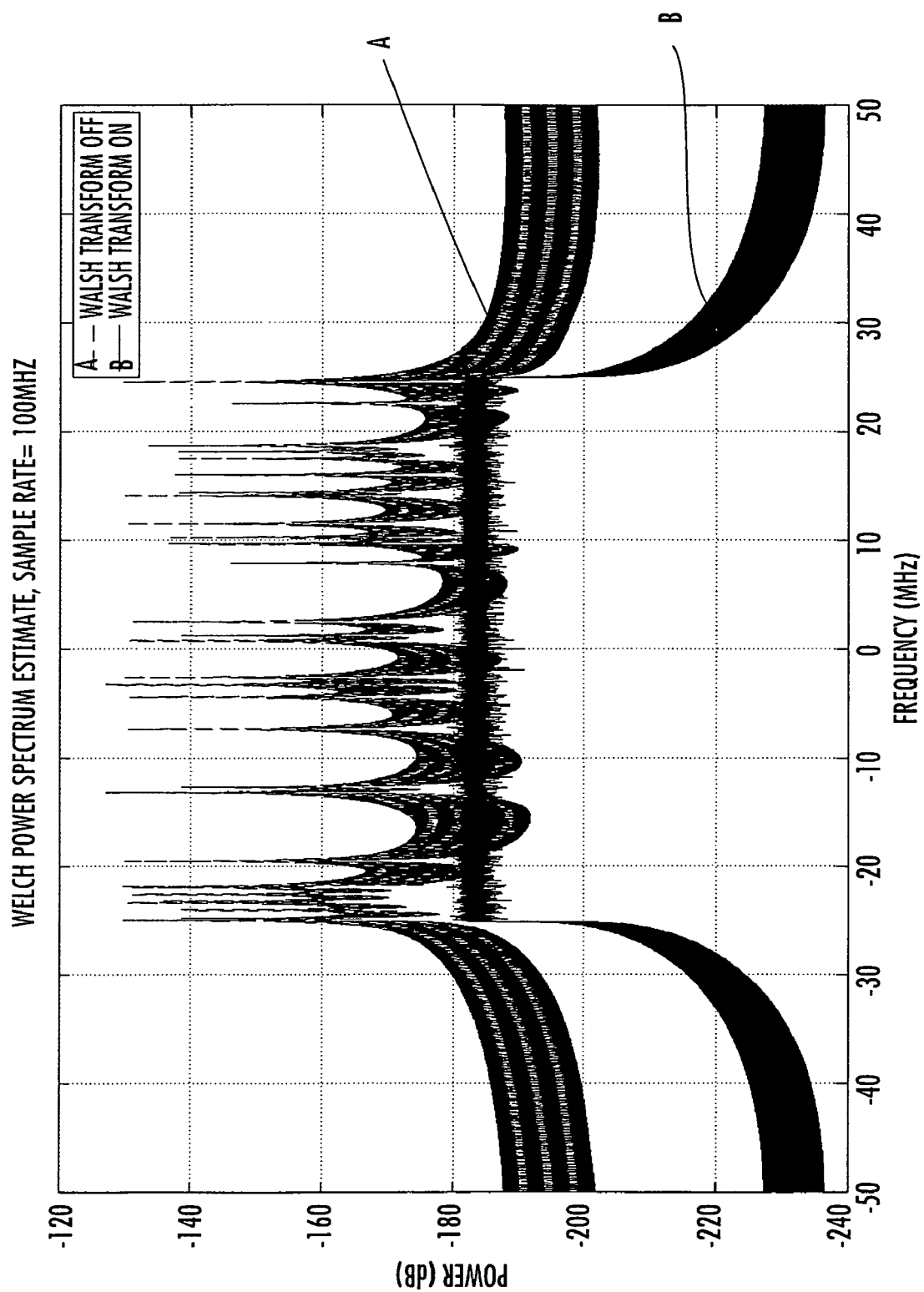
FIG. 12 is a graph of power vs. frequency showing the addition of the Walsh transform to the subcarriers of the frequency hopping OFDM signal in which subcarriers are symbol-based and randomized in accordance with a non-limiting example of the present invention.

FIG. 12 is a graph showing the addition of the Walsh transform to the Symbol-Based Randomized subcarriers in accordance with a non-limiting example of the present invention. The Walsh transform is shown when it is OFF and ON, also showing the various differences in power.

Figure 13:
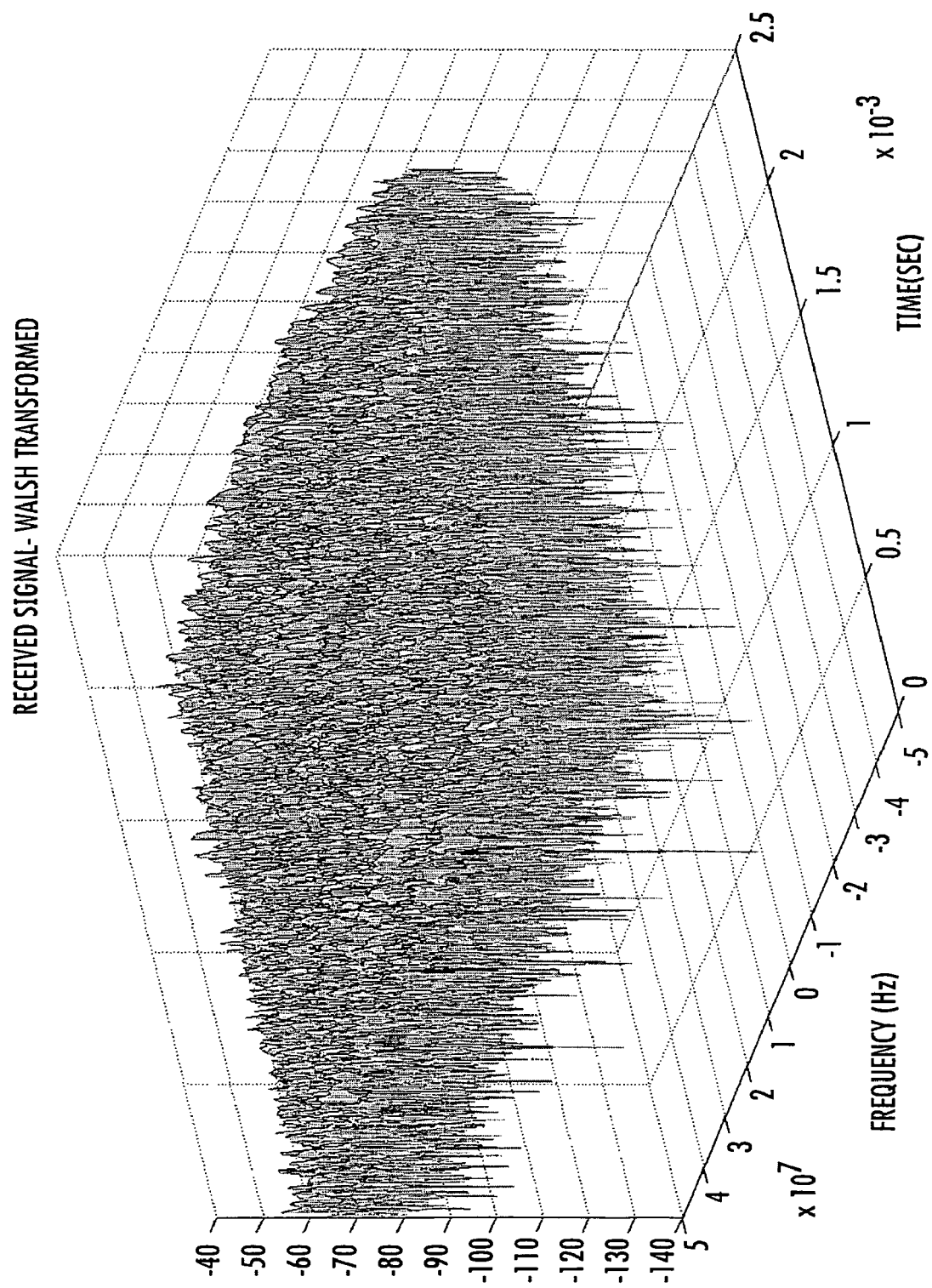
FIG. 13 is a graph showing a three-dimensional representation of the received frequency hopping OFDM signal before the Inverse Walsh transform.

FIG. 13 is a graph showing the received frequency hopping OFDM signal in three-dimensions before the Inverse Walsh transform, and suggesting how difficult the signal could be to decode without knowing the encryption algorithm.

Figures 14A, 14B:
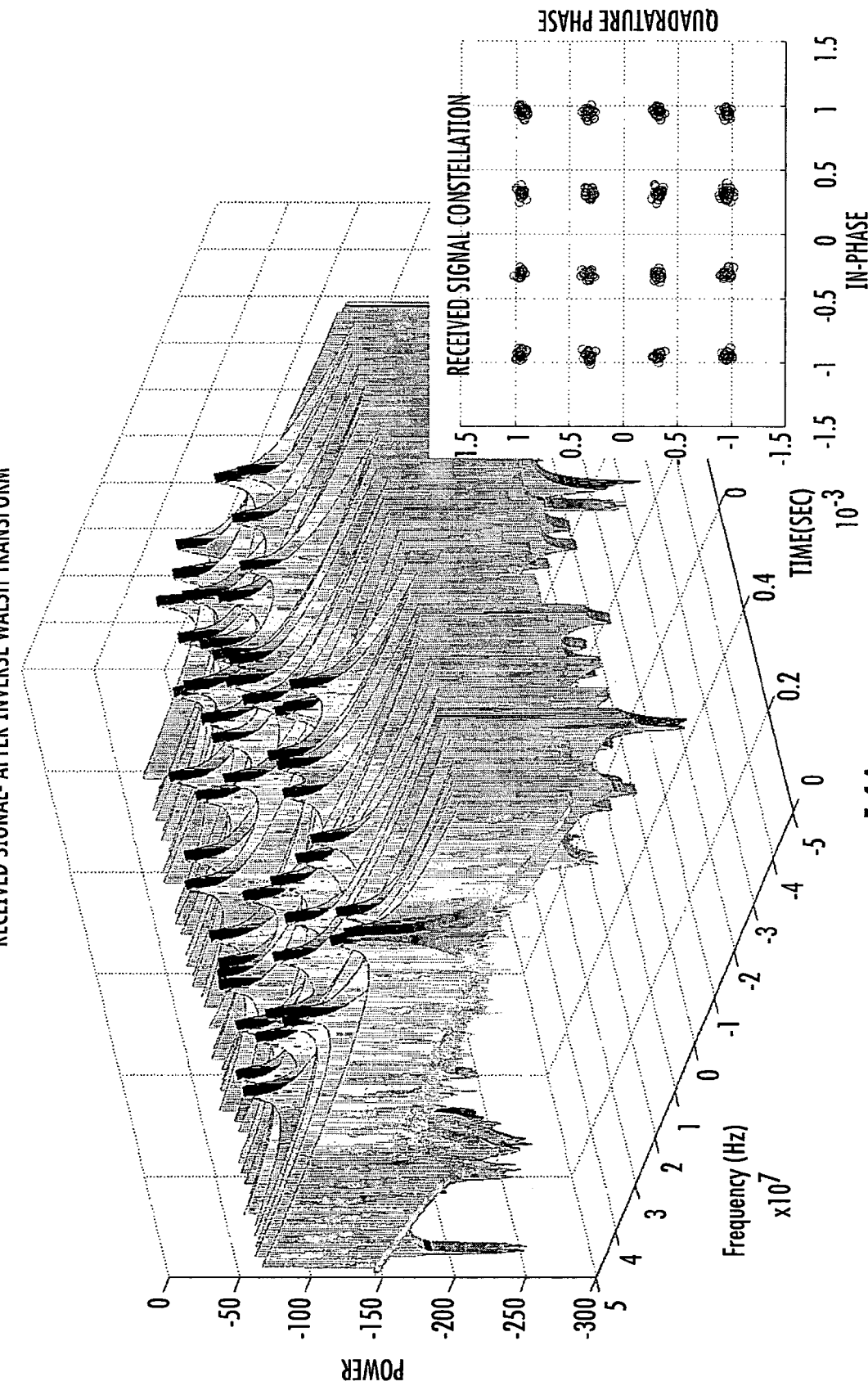
FIG. 14 is a graph showing a three-dimensional representation of the received frequency hopping OFDM signal after the Inverse Walsh transform and also showing the received signal constellation.

FIG. 14A is a three-dimensional graph showing the received signal from FIG. 13 after the Inverse Walsh transform is applied, in which the signal "pops" out and can be decoded. The received signal constellation after the inverse Walsh transform is shown in the lower right at FIG. 14B.

FIGS. 15A and 15B show the frequency hopping OFDM signal before and after the Walsh transform in which a single carrier system is shown in the middle of the band at 1501. As shown in the graph of FIG. 15B, after the Walsh transform, the single carrier does not have the Walsh transform applied, but the other OFDM signal, subject to the frequency hopping in accordance with a non-limiting example of the present invention, is spread over frequency.

Figure 16:
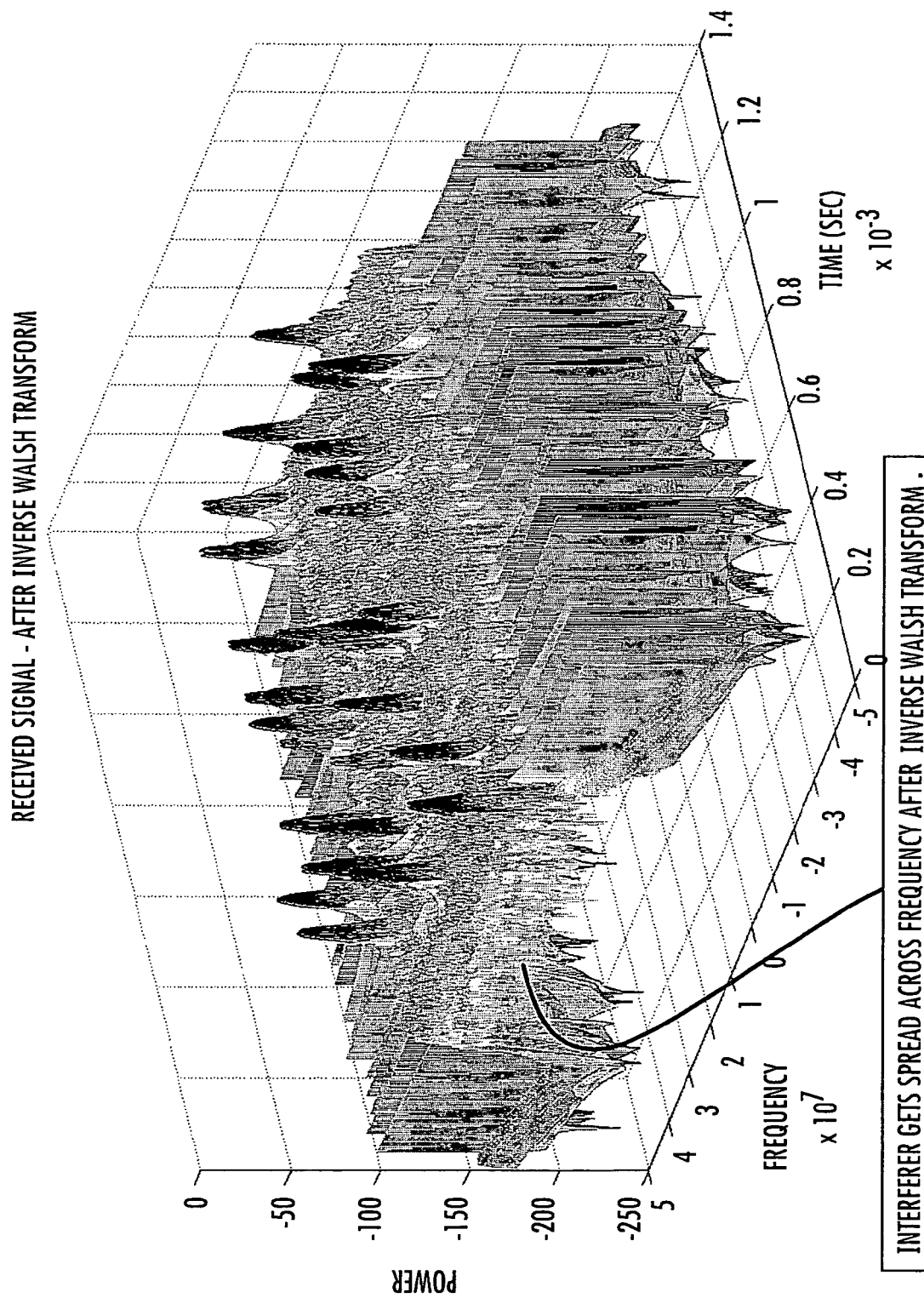
FIG. 16 is a graph showing a three-dimensional representation of a received frequency hopping OFDM signal with an interfering signal after frequency-domain despreading in accordance with a non-limiting example of the present invention.

FIG. 16 is a three-dimensional graph showing a frequency-domain despreading with an interferer in which the interferer is spread across the frequency after the Inverse Walsh transform. Thus, there is a frequency-domain despreading with the interferer.

Figure 17:
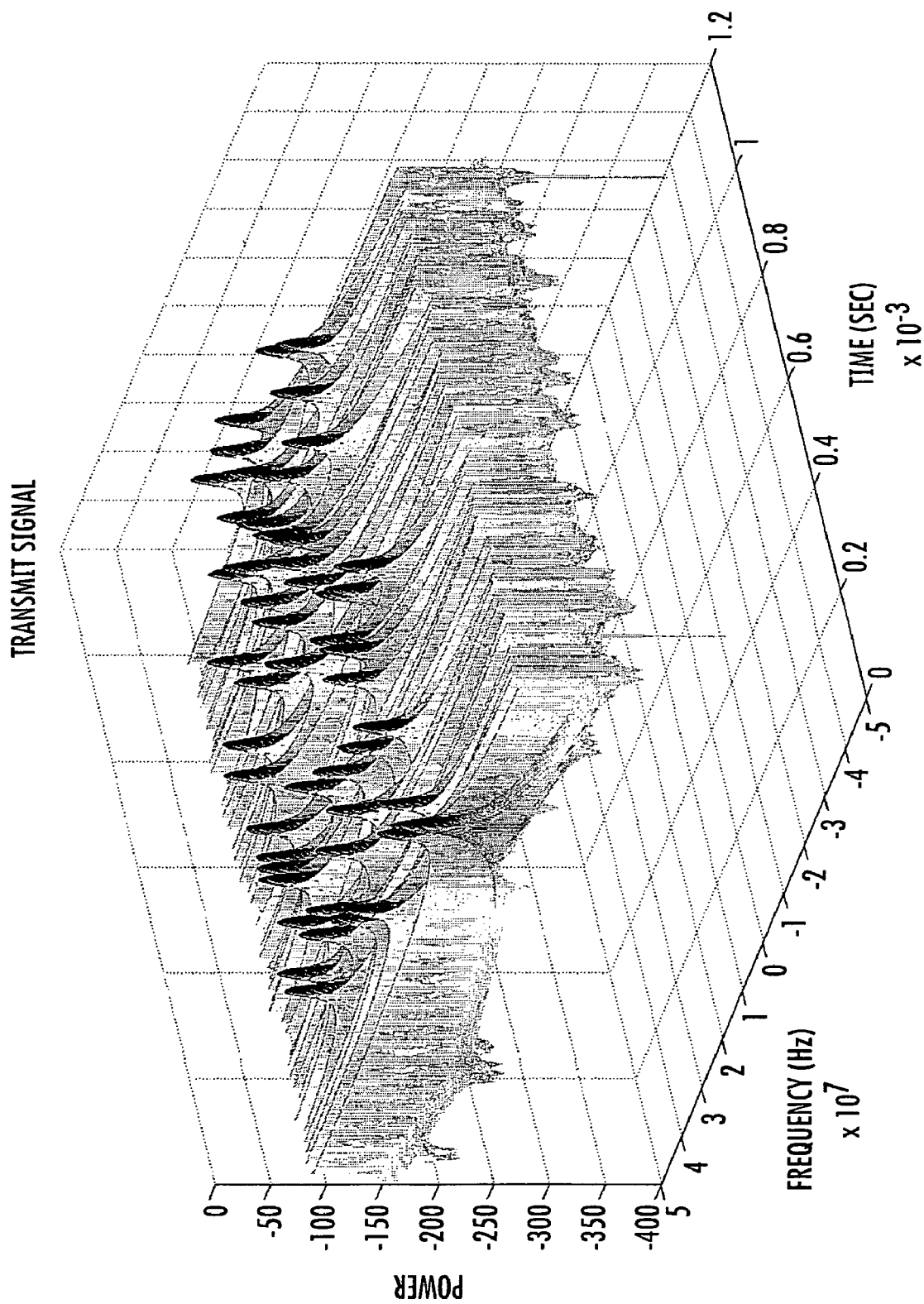
FIG. 17 is a graph showing a three-dimensional representation of the frequency hopping OFDM signal before the Walsh transform in which noise is added.

FIG. 17 shows the transmitted OFDM signal before the Walsh transform in a similar simulation before adding noise. This figure shows the transmitted signal before application of the frequency-domain spreading and transmission over the noisy channel.

Figure 18:
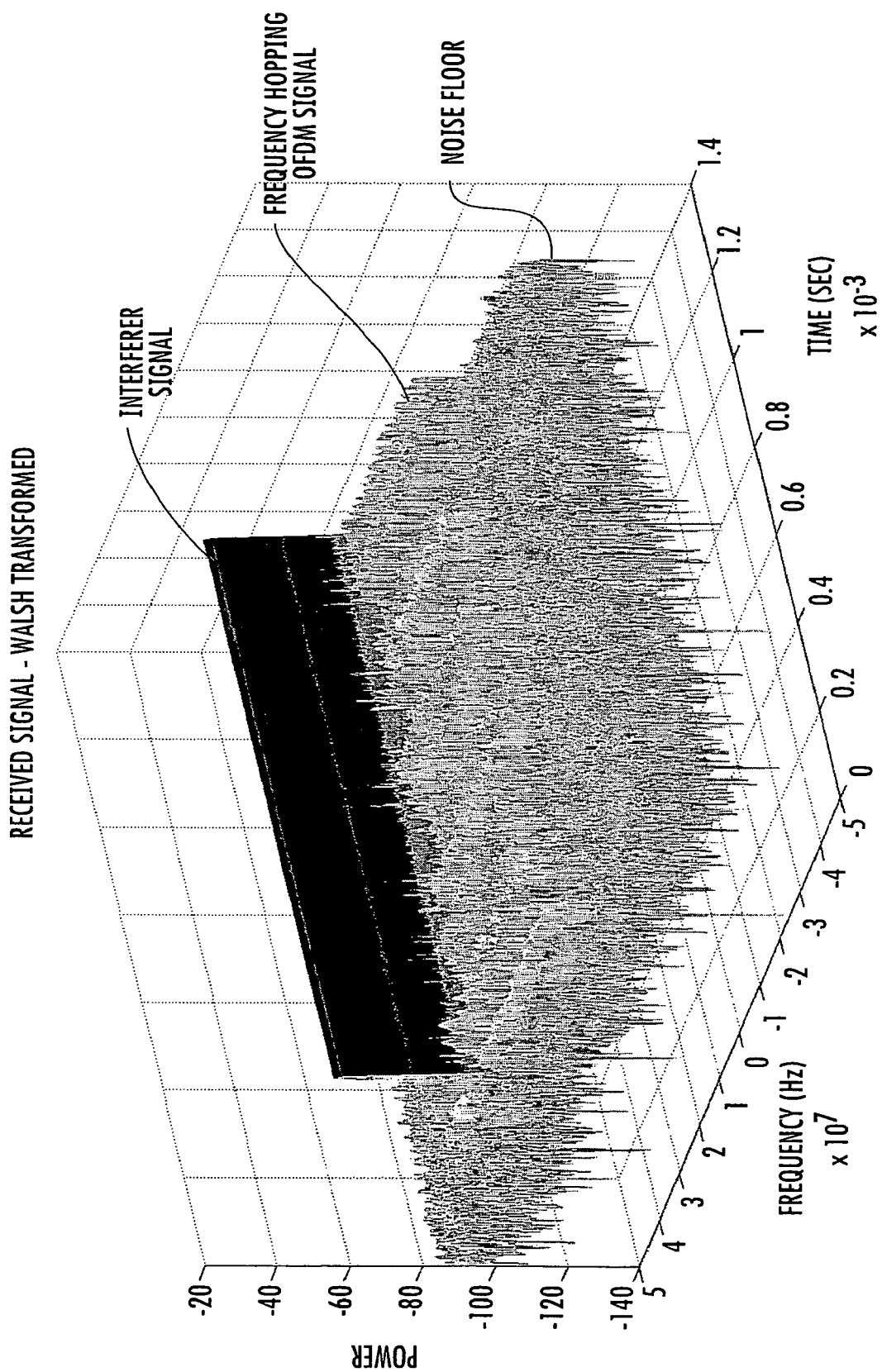
FIG. 18 is a graph showing a three-dimensional representation of a received frequency hopping OFDM signal with an interferer before the Inverse Walsh transform in accordance with a non-limiting example of the present invention.

FIG. 18 shows a received OFDM signal with the interferer before the Inverse Walsh transform for a real noise environment and showing the extended interferer signal. The frequency hopping and spread OFDM signal is shown above the noise floor.

Figure 19:
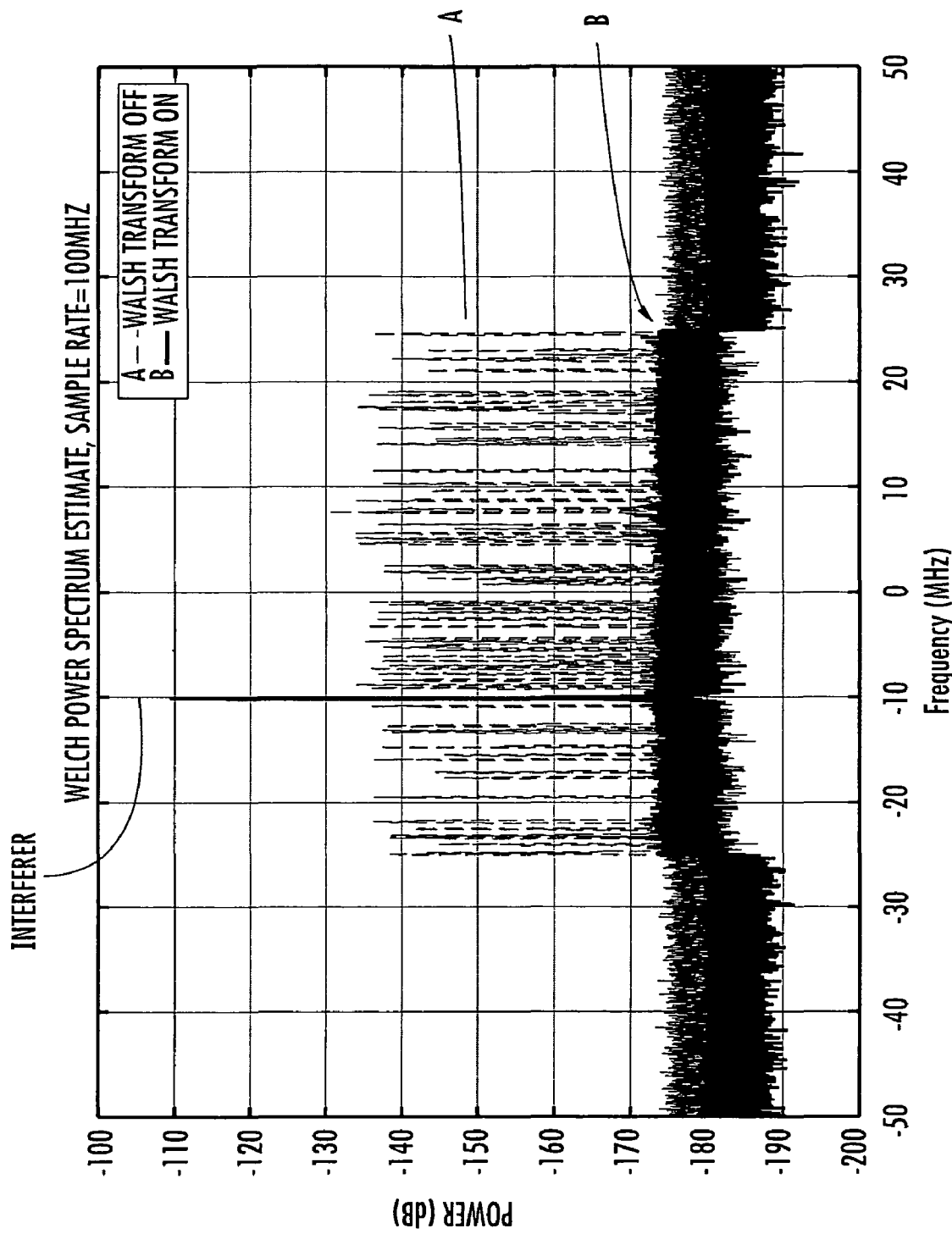
FIG. 19 is a graph showing a spectral comparison of the frequency hopping OFDM signal with an interferer, illustrating the spectrum with graphical representations when the Walsh transform is ON and OFF in accordance with a non-limiting example of the present invention.

FIG. 19 is a graph showing a spectral comparison with the Walsh transform ON and OFF with the interferer and showing the interferer and the frequency hopping OFDM signal and the location of the Walsh transformed signal.

Figure 20:
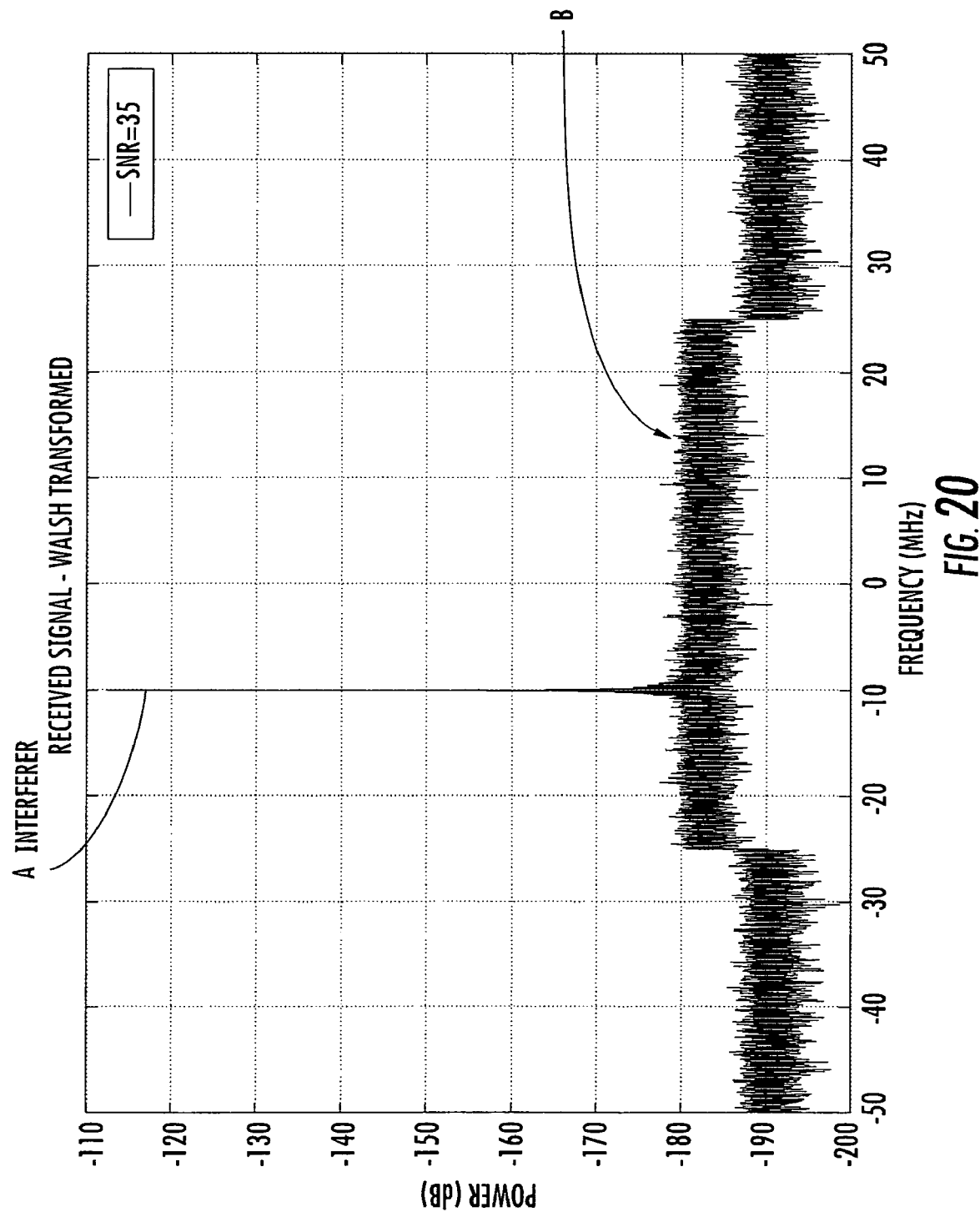
FIG. 20 is a graph showing the power spectrum of the received frequency hopping OFDM signal with an interferer before the Inverse Walsh transform.

FIG. 20 is a power spectrum of a received frequency hopping and spread OFDM signal with the interferer before the Inverse Walsh transform.

Figure 21:
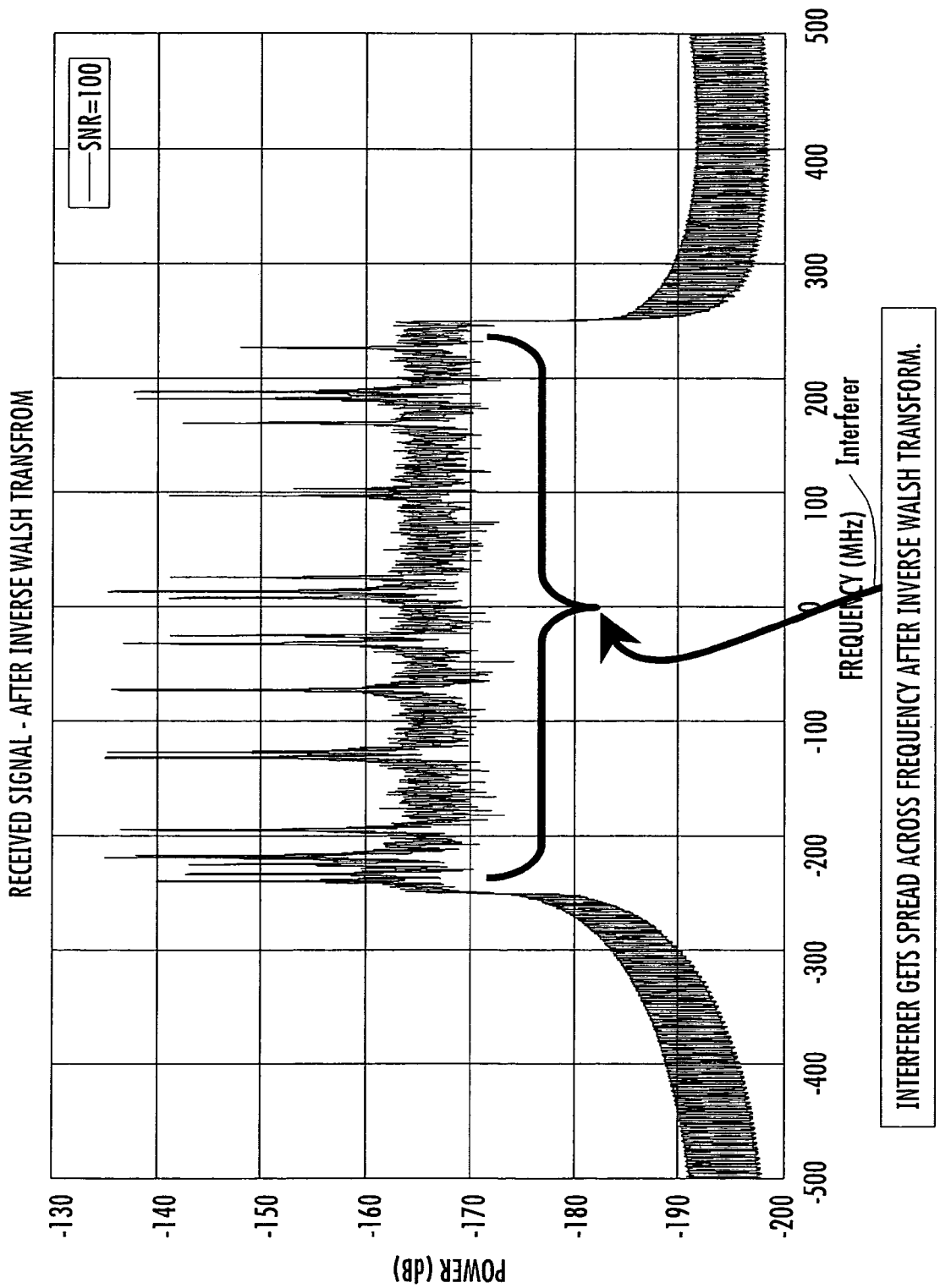
FIG. 21 is a graph showing the frequency-domain despreading of the frequency hopping OFDM signal with an interferer in accordance with a non-limiting example of the present invention.

FIG. 21 is a graph in two-dimension showing the frequency-domain despreading with the interferer in which the interferer is spread across the frequency after the Inverse Walsh transform.

Figure 22:
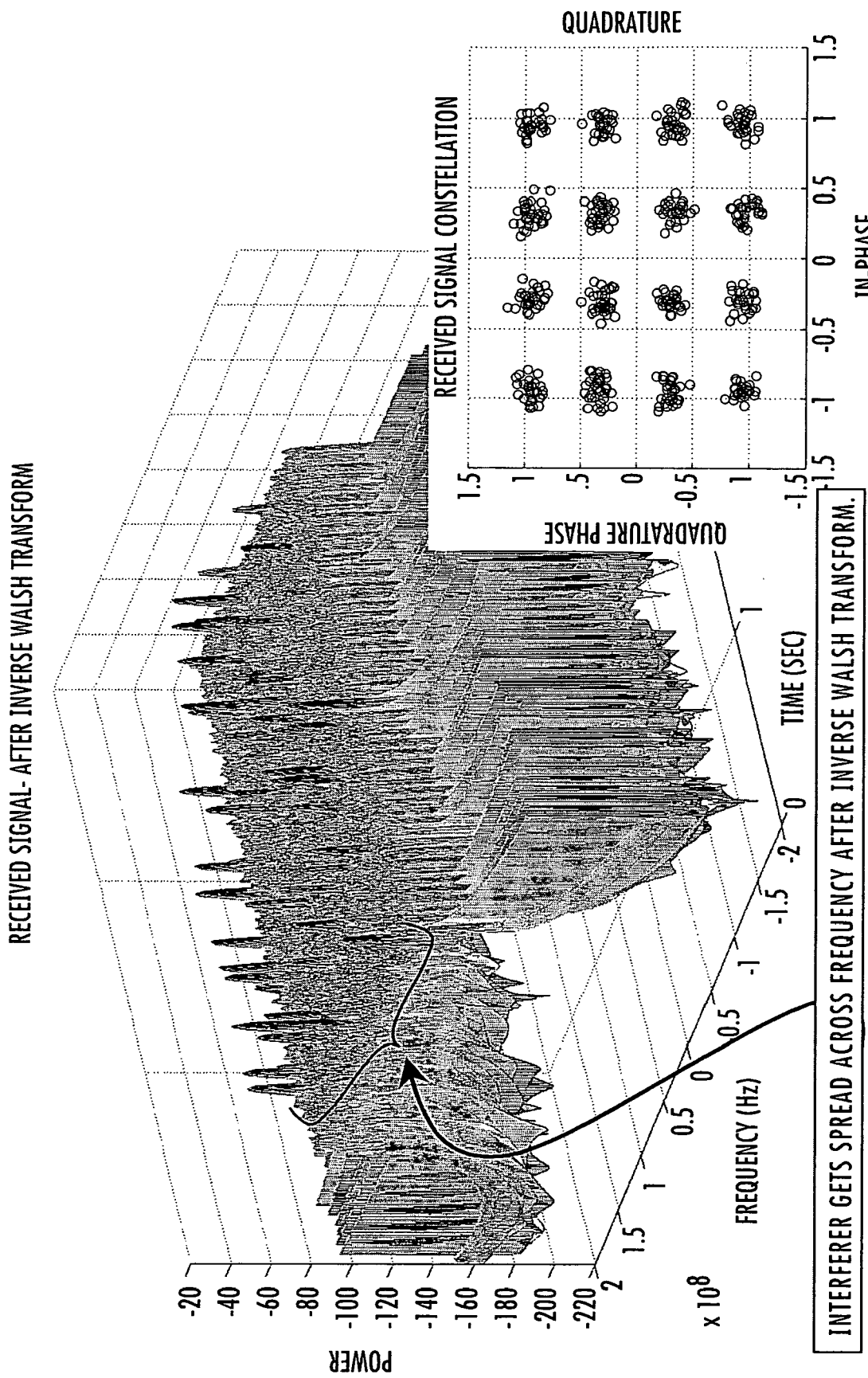
FIG. 22 is a graph showing a three-dimensional representation of the frequency hopping OFDM signal with frequency-domain despreading and with an interferer and also showing a received signal constellation in accordance with a non-limiting example of the present invention.

FIG. 22 is a graph showing the frequency-domain despreading with the interferer spread across frequency after the Inverse Walsh transform and showing a received signal constellation.

Figure 23:
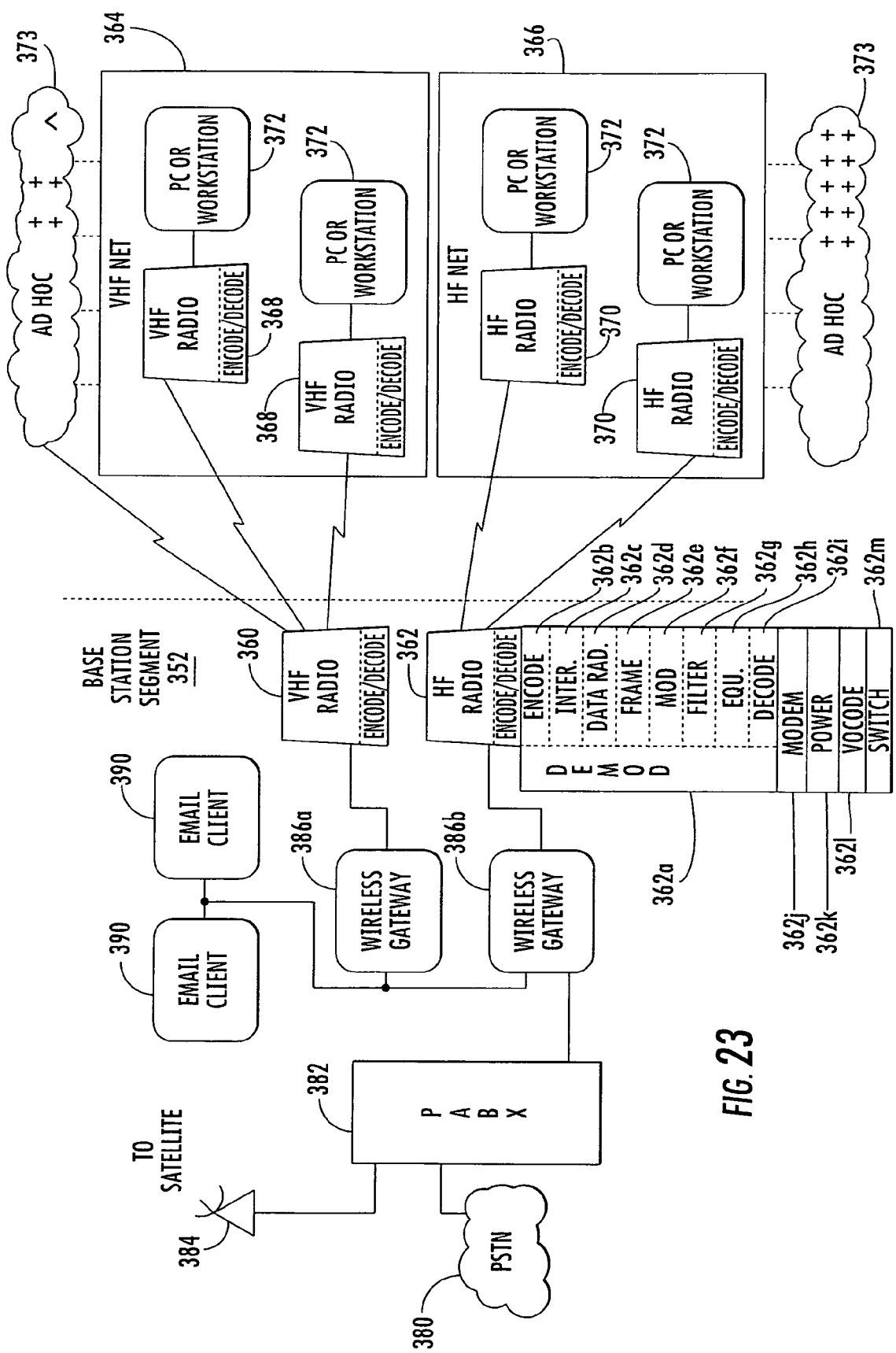
FIG. 23 is a block diagram of an example of a communications system that can be used in accordance with a non-limiting example of the present invention.

An example of a communications system that can be modified for use with the present invention is now set forth with regard to FIG. 23.

An example of a radio that can be used with such system and method is a Falcon™ III radio manufactured and sold by Harris Corporation of Melbourne, Fla. The Falcon™ III can include a basic transmit switch, and other functional switches and controls known to those skilled in the art. It should be understood that different radios can be used, including but not limited to software defined radios that can be typically implemented with relatively standard processor and hardware components. One particular class of software radio is the Joint Tactical Radio (JTR), which includes relatively standard radio and processing hardware along with any appropriate waveform software modules to implement desired communication waveforms. JTR radios also use operating system software that conforms to the software communications architecture (SCA) specification, which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 23. This high level block diagram of a communications system 350 includes a base station segment 352 and wireless message terminals that could be modified for use with the present invention. The base station segment 352 includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368, 370. Ad-hoc communication networks 373 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 362a and appropriate convolutional encoder circuit 362b, block interleaver 362c, data randomizer circuit 362d, data and framing circuit 362e, modulation circuit 362f, matched filter circuit 362g, block or symbol equalizer circuit 362h with an appropriate clamping device, deinterleaver and decoder circuit 362i modem 362j, and power adaptation circuit 362k as non-limiting examples. A vocoder (voice encoder/decoder) circuit 362l can incorporate the encode and decode functions and a conversion unit which can be a combination of the various circuits as described or a separate circuit. A transmit key switch 362m is operative as explained above. These and other circuits operate to perform any functions necessary for the present invention, as well as other functions suggested by those skilled in the art. The circuits referenced here may include any combination of software and/or hardware elements, including but not limited to general purpose microprocessors and associated software, specialized microprocessors for digital signal processing and their associated software, Application Specific Integrated Circuits (ASICs), Field Programmable Gate Arrays (FPGAs), logic circuits, or other kinds of devices and/or software or firmware known to those skilled in the art. Other illustrated radios, including all VHF mobile radios and transmitting and receiving stations can have similar functional circuits.

The base station segment 352 includes a landline connection to a public switched telephone network (PSTN) 380, which connects to a PABX 382. A satellite interface 384, such as a satellite ground station, connects to the PABX 382, which connects to processors forming wireless gateways 386a, 386b. These interconnect to the VHF radio 360 or HF radio 362, respectively. The processors are connected through a local area network to the PABX 382 and e-mail clients 390. The radios include appropriate signal generators and modulators. The packetized or non-packetized digital voice information transmitted within the network using the techniques of the present invention can originate at or be delivered to a handset connected to one of the radios, a telephone or other interface device attached to a wireless gateway device such as the RF-6010 Tactical Network Hub, or a subscriber telephone connected to the PABX or within the public switched telephone network.

An Ethernet/TCP-IP local area network can operate as a "radio" mail server. E-mail messages can be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, can be used with legacy wireless devices. Examples of equipment that can be used in the present invention include different wireless gateway and radios manufactured by Harris Corporation of Melbourne, Fla. This equipment includes RF5800, 5022, 7210, 5710, 6010, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps or higher with a radio set to ISB mode and an HF modem set to a fixed data rate. It is possible to use code combining techniques and ARQ.

This application is related to copending patent applications entitled, "SYSTEM AND METHOD FOR COMMUNICATING DATA USING SYMBOL-BASED RANDOMIZED ORTHOGONAL FREQUENCY DIVISION MULTIPLEXING (OFDM)," and "SYSTEM AND METHOD FOR APPLYING FREQUENCY DOMAIN SPREADING TO MULTI-CARRIER COMMUNICATIONS SIGNALS," and "SYSTEM AND METHOD FOR COMMUNICATING DATA USING SYMBOL-BASED RANDOMIZED ORTHOGONAL FREQUENCY DIVISION MULTIPLEXING (OFDM) WITH APPLIED FREQUENCY DOMAIN SPREADING," and "METHOD OF COMMUNICATING AND ASSOCIATED TRANSMITTER USING CODED ORTHOGONAL FREQUENCY DIVISION MULTIPLEXING (COFDM)," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A device for communicating data, comprising:
    a modulation and mapping circuit that modulates and maps data symbols into a plurality of multiple subcarrier frequencies that are orthogonal to each other to form an Orthogonal Frequency Division Multiplexed (OFDM) communications signal based on a fixed or variable OFDM symbol rate; and
    a pseudo-random signal generator operative with the modulation and mapping circuit for generating pseudo-random signals to the modulation and mapping circuit using an encryption algorithm for changing subcarrier constellation amplitude and phase values and frequency hopping each subcarrier at an OFDM symbol rate such that each subcarrier is frequency hopped at an OFDM symbol rate and subcarrier center frequencies are changed at OFDM symbol times using the same encryption algorithm used to change subcarrier constellation amplitude and phase values, wherein selected subcarriers are turned ON or OFF pseudo-randomly to increase transmit power and signal-to-noise ratio and reduce any Intercarrier Interference (ICI) and adverse effects of Frequency Selective Fading.

2. The device according to claim 1, wherein selected subcarriers are turned ON or OFF depending on the required data rate to be transmitted.

3. The device according to claim 1, wherein selected subcarriers are turned ON or OFF relative to a number of subcarriers and desired transmit power for allowing a trade-off for data rate and distance within a spectral mask.

4. The device according to claim 1, wherein said pseudo-random generator comprises a dead-time pseudo-random generator for decreasing an ON time of subcarriers and increasing an output spacing of symbols to reduce continuous transmission time.

5. The device according to claim 1, wherein any spacing between symbols is varied to prevent spectral lines and reduce cyclostationary statistics of the signal.

6. The device according to claim 1, wherein selected subcarriers are turned ON or OFF based on one of least received signal-to-noise ratio, location of interferers, channel impairments, negotiated channel mask with a receiver, desired data rate, desired signal range, and transmit power requirements.

7. The device according to claim 1, and further comprising a frequency domain spreader circuit for spreading any ON subcarriers over the frequency domain.

8. The device according to claim 1, wherein said pseudo-random signal generator is operative for generating a pseudo-random signal based on said encryption algorithm such that consecutive OFDM symbols do not transmit subcarriers on the same frequency.

9. The device according to claim 1, wherein said pseudo-random signal generator is operative for generating a pseudo-random signal based on said encryption algorithm such that OFDM symbols do not transmit subcarriers on adjacent frequencies for reduced Inter-Carrier Interference (ICI).

10. The device according to claim 1, wherein said pseudo-random signal generator is operative for generating a pseudo-random signal based on said encryption algorithm such that a Guard Interval is reduced or eliminated.

11. The device according to claim 1, wherein said modulation and mapping circuit is operative for inserting signals for reducing peak-to-average-power ratio (PAPR).

12. The device according to claim 1, wherein said pseudo-random signal generator is operatively connected to said modulator for varying amplitude and phase values using an encryption algorithm.

13. The device according to claim 1, and further comprising an encoder for adding a Forward Error Correction (FEC) code.

14. A system for communicating data, comprising:
a transmitter for transmitting a communications signal that carries communications data and comprises a modulation and mapping circuit that maps data symbols into a plurality of multiple subcarrier frequencies that are orthogonal to each other to form an Orthogonal Frequency Division Multiplexed (OFDM) communications signal based on a fixed or variable OFDM symbol rate, and a pseudo-random signal generator operative with the modulation and mapping circuit for generating pseudo-random signals to the modulation and mapping circuit using an encryption algorithm for changing subcarrier constellation amplitude and phase values and frequency hopping each subcarrier at an OFDM symbol rate such that each subcarrier is frequency hopped at an OFDM symbol rate and subcarrier center frequencies are changed at OFDM symbol times using the same encryption algorithm used to change subcarrier constellation amplitude and phase values, wherein selected subcarriers are turned ON or OFF pseudo-randomly to increase transmit power and signal-to-noise ratio and reduce any Intercarrier Interference (ICI) and adverse effects of Frequency Selective Fading; and a receiver for receiving the communications signal and includes a demapping and demodulation circuit for processing the communications signal to obtain the communications data.

15. The system according to claim 14, wherein said receiver is operative for transmitting a signal back to said transmitter for varying the transmitted signal by selectively turning ON or OFF subcarriers.

16. The system according to claim 14, wherein subcarriers are turned ON or OFF depending on the required data rate to be transmitted.

17. The system according to claim 14, wherein selected subcarriers are turned ON or OFF relative to a number of subcarriers and desired transmit power for allowing a trade-off for data rate and distance within a spectral mask.

18. The system according to claim 14, wherein said pseudo-random generator comprises a dead-time pseudo-random generator for decreasing an ON time and increasing an output spacing of symbols to reduce continuous transmission time.

19. The system according to claim 14, wherein any spacing between symbols is varied to prevent spectral lines and reduce cyclostationary statistics of the signal.

20. The system according to claim 14, wherein selected subcarriers are turned ON or OFF based on one of least received signal-to-noise ratio, location of interferers, channel impairments, negotiated channel mask with a receiver, desired data rate, desired signal range, and transmit power requirements.

21. The system according to claim 14, and further comprising a frequency domain spreader circuit for spreading any ON subcarriers over the frequency domain.

22. The system according to claim 14, wherein said pseudo-random signal generator is operative for generating a pseudo-random signal based on said encryption algorithm such that consecutive OFDM symbols do not transmit subcarriers on the same frequency.

23. The system according to claim 14, wherein said pseudo-random signal generator is operative for generating a pseudo-random signal based on said encryption algorithm such that OFDM symbols do not transmit subcarriers on adjacent frequencies for reduced Inter-Carrier Interference (ICI).

24. The system according to claim 14, wherein said pseudo-random signal generator is operative for generating a pseudo-random signal based on said encryption algorithm such that a Guard Interval is reduced or eliminated.

25. The system according to claim 14, wherein said pseudo-random signal generator is operatively connected to said modulator for varying amplitude and phase values using an encryption algorithm.

26. The system according to claim 14, wherein said transmitter further comprises a circuit for inserting signals for reducing peak-to-average-power ratio (PAPR).

27. A method for communicating data, which comprises:
distributing communications data over multiple subcarrier frequencies that are orthogonal to each other to form an Orthogonal Frequency Division Multiplexed (OFDM) communications signal based on fixed or variable OFDM symbol rate;
changing subcarrier constellation amplitude and phase values and frequency hopping each subcarrier at an OFDM symbol rate using an encryption algorithm while also changing subcarrier center frequencies of OFDM symbol times using the same encryption algorithm used to change subcarrier constellation amplitude and phase values;

turning ON and OFF pseudo-randomly selected subcarriers for increasing transmit power and signal-to-noise ratio and reducing any Intercarrier Interference (ICI) and adverse effects of Frequency Selective Fading; and transmitting the communications data over a communications signal that includes the frequency hopping subcarriers.

28. The method according to claim 27, which further comprises receiving a signal back from the receiver, and in response, selectively turning ON or OFF subcarriers.

29. The method according to claim 27, which further comprises turning subcarriers ON or OFF depending on the required data rate to be transmitted.

30. The method according to claim 27, which further comprises turning selected subcarriers ON or OFF relative to a number of subcarriers and desired transmit power for allowing a trade-off for data rate and distance within a spectral mask.

31. The method according to claim 27, which further comprises decreasing the ON time of subcarriers and increasing the output spacing of symbols to reduce continuous transmission time.

32. The method according to claim 27, which further comprises varying the spacing between symbols to prevent spectral lines and reduce cyclostationary statistics of the communications signal.

33. The method according to claim 27, which further comprises turning ON or OFF selected subcarriers based on of least received signal-to-noise ratio, location of interferers, channel impairments, negotiated channel mask with a receiver, desired data rate, desired signal range, and transmit power requirements.

34. The method according to claim 27, which further comprises generating a pseudo-random signal based on said encryption algorithm such that consecutive OFDM symbols do not transmit subcarriers on the same frequency.

35. The method according to claim 27, which further comprises generating a pseudo-random signal based on said encryption algorithm such that OFDM symbols do not transmit subcarriers on adjacent frequencies for reduced Inter-Carrier Interference (ICI).

36. The method according to claim 27, which further comprises generating a pseudo-random signal based on said encryption algorithm such that a Guard Interval is reduced or eliminated.

37. The method according to claim 27, which further comprises inserting signals for reducing peak-to-average-power ratio (PAPR).

38. A device for communicating data, comprising:
a modulation and mapping circuit that modulates and maps data symbols into a plurality of multiple subcarrier frequencies that are orthogonal to each other to form an Orthogonal Frequency Division Multiplexed (OFDM) communications signal based on a fixed or variable OFDM symbol rate; and
a pseudo-random signal generator operative with the modulation and mapping circuit for generating pseudo-random signals to the modulation and mapping circuit using an encryption algorithm for frequency hopping each subcarrier at an OFDM symbol rate to lower any probability of interception and detection, reduce power per frequency (dB/Hz/sec), and lower any required transmission power while maintaining an instantaneous signal-to-noise ratio, wherein selected subcarriers are turned ON or OFF to increase transmit power and signal-to-noise ratio and reduce any Intercarrier Interference (ICI) and adverse effects of Frequency Selective Fading, wherein said pseudo-random generator comprises a dead-time pseudo-random generator for decreasing an ON time of subcarriers and increasing the output spacing of symbols to reduce continuous transmission time.

39. A system for communicating data, comprising:
a transmitter for transmitting a communications signal that carries communications data and comprises a modulation and mapping circuit that maps data symbols into a plurality of multiple subcarrier frequencies that are orthogonal to each other to form an Orthogonal Frequency Division Multiplexed (OFDM) communications signal based on a fixed or variable OFDM symbol rate, and a pseudo-random signal generator operative with the modulation and mapping circuit for generating pseudo-random signals to the modulation and mapping circuit using an encryption algorithm for frequency hopping each subcarrier at an OFDM symbol rate to lower any probability of interception and detection, reduce power per frequency (dB/Hz/sec), and lower any required transmission power while maintaining an instantaneous signal-to-noise ratio, wherein selected subcarriers are turned ON or OFF to increase transmit power and signal-to-noise ratio and reduce any Intercarrier Interference (ICI) and adverse effects of Frequency Selective Fading, wherein said pseudo-random generator comprises a dead-time pseudo-random generator for decreasing an ON time and increasing any output spacing of symbols to reduce continuous transmission time; and
a receiver for receiving the communications signal and includes a demapping and demodulation circuit for processing the communications signal to obtain the communications data.

40. A method for communicating data, which comprises:
distributing communications data over multiple subcarrier frequencies that are orthogonal to each other to form an Orthogonal Frequency Division Multiplexed (OFDM) communications signal based on fixed or variable OFDM symbol rate;
frequency hopping each subcarrier at an OFDM symbol rate to lower any probability of interception and detection, reduce power per frequency (dB/Hz/sec), and lower any required transmission power while maintaining an instantaneous signal-to-noise ratio;
turning ON and OFF selected subcarriers for increasing transmit power and signal-to-noise ratio and reducing any Intercarrier Interference (ICI) and adverse effects of Frequency Selective Fading while also generating pseudo-random signals to a modulation and mapping circuit using a pseudo-random generator that comprises a dead-time pseudo-random generator for decreasing an ON time of subcarriers and increasing any output spacing of symbols to reduce continuous transmission time; and
transmitting the communications data over a communications signal that includes the frequency hopping subcarriers.

* * * * *